(12) United States Patent
Miao et al.

(10) Patent No.: US 12,490,333 B2
(45) Date of Patent: Dec. 2, 2025

(54) INDICATION METHOD AND DEVICE

(71) Applicant: DATANG MOBILE COMMUNICATIONS EQUIPMENT CO., LTD., Beijing (CN)

(72) Inventors: Jinhua Miao, Beijing (CN); Erlin Zeng, Beijing (CN); Jing Fu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 434 days.

(21) Appl. No.: 18/009,279

(22) PCT Filed: May 12, 2021

(86) PCT No.: PCT/CN2021/093292
§ 371 (c)(1),
(2) Date: Dec. 8, 2022

(87) PCT Pub. No.: WO2021/249092
PCT Pub. Date: Dec. 16, 2021

(65) Prior Publication Data
US 2023/0239956 A1    Jul. 27, 2023

(30) Foreign Application Priority Data
Jun. 9, 2020  (CN) .......................... 202010518038.3

(51) Int. Cl.
*H04W 76/20*    (2018.01)
*H04W 72/1268*    (2023.01)
(Continued)

(52) U.S. Cl.
CPC ....... *H04W 76/20* (2018.02); *H04W 72/1268* (2013.01); *H04W 72/23* (2023.01);
(Continued)

(58) Field of Classification Search
None
See application file for complete search history.

(56) References Cited

U.S. PATENT DOCUMENTS

2018/0049244 A1  2/2018 Lee
2018/0139778 A1  5/2018 Chou
(Continued)

FOREIGN PATENT DOCUMENTS

CN    108430112 A    8/2018
CN    109587769 A    4/2019
(Continued)

OTHER PUBLICATIONS

First Chinese Office Action and search report for the corresponding Chinese Patent Application No. 202010518038.3 issued by the Chinese Patent Office on Jul. 12, 2023 and its English translation provided by foreign associate.
(Continued)

*Primary Examiner* — Kouroush Mohebbi
(74) *Attorney, Agent, or Firm* — Ladas & Parry, LLP

(57) ABSTRACT

An indication method and an indication device are provided. The method includes sending first indication information to a network side when a terminal is in a RRC idle state or an RRC inactive state, the first indication information indicating that UL data of the terminal satisfies a first condition which comprises one or more of: a data amount of the UL data is greater than a first threshold; a data amount of the UL data is less than a second threshold; a data amount of the UL data is greater than a first threshold and a data amount of the UL data is less than a second threshold; a DRB triggering a UL data transmission procedure is configured by the network side.

20 Claims, 19 Drawing Sheets

Receiving first indication information from a terminal which is in an RRC idle state or an RRC inactive state, wherein the first indication information is configured to indicate that UL data of the terminal satisfies a first condition — 701

(51) Int. Cl.
    *H04W 72/23*     (2023.01)
    *H04W 74/0833*     (2024.01)
    *H04W 76/30*     (2018.01)
    *H04W 74/0836*     (2024.01)

(52) U.S. Cl.
    CPC ....... *H04W 74/0833* (2013.01); *H04W 76/30* (2018.02); *H04W 74/0836* (2024.01)

(56) References Cited

U.S. PATENT DOCUMENTS

| | | |
|---|---|---|
| 2020/0252958 A1 | 8/2020 | Lu et al. |
| 2021/0212074 A1 | 7/2021 | Yu et al. |
| 2021/0274525 A1* | 9/2021 | Wei .................. H04W 76/27 |

FOREIGN PATENT DOCUMENTS

| | | |
|---|---|---|
| CN | 110139365 A | 8/2019 |
| CN | 110856276 A | 2/2020 |
| EP | 3855851 A1 | 7/2021 |
| WO | 2018126801 A1 | 7/2018 |
| WO | 2020043211 A1 | 3/2020 |
| WO | 2020061867 A1 | 4/2020 |
| WO | 2020067790 A1 | 4/2020 |
| WO | 2020069103 A1 | 4/2020 |

OTHER PUBLICATIONS

Extended European Search Report for the corresponding European Patent Application No. 21822007.7 issued by the European Patent Office on Oct. 10, 2023.
International Search Report for PCT/CN2021/093292 issued on Aug. 10, 2021 and its English Translation provided by WIPO.
Written Opinion for PCT/CN2021/093292 issued on Aug. 10, 2021 and its English Translation provided by WIPO.
International Preliminary Report on Patentibily for PCT/CN2021/093292 issued on Dec. 13, 2022 and its English translation provided by WIPO.
"Transmission in D-PUR in idle mode," 3GPP TSG RAN WG2 Meeting #106, R2-1906440, Revision of R2-1903665 , Reno, USA, May 13 to 17, 2019, Agenda item: 12.2.4, Source: Intel Corporation, all pages.

* cited by examiner

| | | |
|---|---|---|
| R | Timing-Advance command | Octet 1 |
| Timing-Advance command | UL grant | Octet 2 |
| UL grant | | Octet 3 |
| UL grant | | Octet 4 |
| UL grant | | Octet 5 |
| Temporary C-RNTI | | Octet 6 |
| Temporary C-RNTI | | Octet 7 |

FIG. 5

Sending first indication information to a network side when a UE is in an RRC idle state or an RRC inactive state, wherein the first indication information is used to indicate that UL data of the UE satisfies a first condition — 601

FIG. 6

Receiving first indication information from a terminal which is in an RRC idle state or an RRC inactive state, wherein the first indication information is configured to indicate that UL data of the terminal satisfies a first condition — 701

FIG. 7

| | | | | | | | |
|---|---|---|---|---|---|---|---|
| UE contention resolution identifier ||||||||
| UE contention resolution identifier ||||||||
| UE contention resolution identifier ||||||||
| UE contention resolution identifier ||||||||
| UE contention resolution identifier ||||||||
| UE contention resolution identifier ||||||||
| R | R | R | R | R | R | TPC ||
| U | HARQ feedback timing indicator ||| Timing-Advance command ||||
| Timing-Advance command ||||||||
| C-RNTI ||||||||
| C-RNTI ||||||||
| UL grant ||||||||
| UL grant ||||||||

FIG. 10

INDICATION METHOD AND DEVICE

CROSS-REFERENCE TO RELATED APPLICATIONS

This application is the U.S. national phase application of a PCT Application No. PCT/CN2021/093292 filed on May 12, 2021, which claims a priority to Chinese Patent Application No. 202010518038.3 filed on Jun. 9, 2020, the disclosures of which are incorporated in their entireties by reference herein.

TECHNICAL FIELD

The present disclosure relates to the field of communications technology, in particular, relates to an indication method and an indication device.

BACKGROUND

In the relate art, when a terminal (for example, a User Equipment (UE)) transmits Uplink (UL) data to a base station through Early Data Transmission (EDT), an uplink grant (UL grant) is sent to the UE through a Random Access Response (RAR), or is sent to the UE through a broadcast message by a network side, or is notified to the UE by a pre-configured method.

A disadvantage of this implementation is that if a packet size of the UE exceeds a size of the UL grant, the UE requests to enter a Radio Resource Control (RRC) connected state. Then, subsequent steps to be performed include:
the UE receives an RRC establishment message sent by the network side;
the UE feeds back an RRC establishment success message;
the UE receives a reconfiguration message sent by the network side;
the UE feeds back a reconfiguration success message;
the UE receives a security message sent by the network side;
the UE feeds back a security success configuration message;
the UE sends a UL data request message to the network side;
the network side schedules the UE by sending an UL grant;
the UE sends remaining of the UL data according to the UL grant;
after determining that the UE has no UL data, the network side sends an RRC release message to the UE;
after receiving the RRC release message, the UE enters a RRC idle (IDLE) state or an inactive (inactive) state.

From the above procedure, it can be found that multiple RRC messages are to be experienced, which will cause large signaling consumption and physical resource consumption.

SUMMARY

An objective of the embodiments of the present disclosure is to provide an indication method and an indication device, so as to solve the problem that a signaling overhead for a UE to enter a connected state is excessive.

In a first aspect, an indication method performed by a terminal is provided in the embodiments of the present disclosure. The method includes: sending first indication information to a network side when the terminal is in a Radio Resource Control (RRC) idle state or an RRC inactive state, the first indication information being configured to indicate that Uplink (UL) data of the terminal satisfies a first condition, wherein the first condition includes one or more of the following:
a data amount of the UL data is greater than a first threshold;
a data amount of the UL data is less than a second threshold;
a Data Radio Bearer (DRB) triggering a UL data transmission procedure is configured by the network side.

Optionally, the method further includes: selecting a UL data transmission procedure when the data amount of the UL data is less than the second threshold, or when the data amount of the UL data is greater than the first threshold and the data amount of the UL data is less than the second threshold, or when the UL data satisfies DRB configuration information configured by the network side, wherein the UL data transmission procedure and an Early Data Transmission (EDT) procedure correspond to different preambles.

Optionally, after sending the first indication information to the network side, the method further includes: receiving a UL grant from the network side; sending the UL data according to the UL grant.

Optionally, receiving the UL grant from the network side includes: receiving a first Random Access Response (RAR) from the network side, the first RAR including the UL grant.

Optionally, the first RAR includes a first field, the first field indicates indication information about whether the first RAR includes the UL grant. Optionally, a type of the first RAR is a fallback RAR or a success RAR.

Optionally, the UL grant is scheduled by a Physical Downlink Control Channel (PDCCH), and a random access radio network temporary identifier for scrambling the PDCCH is notified by the first RAR or configured by a RRC release message.

Optionally, the method further includes: receiving second indication information from the network side, wherein the second indication information indicates the terminal to send the UL data using a configured grant resource.

Optionally, receiving the second indication information from the network side includes: receiving a second RAR from the network side, wherein the second RAR carries second indication information; or, receiving a Physical Downlink Control Channel (PDCCH) from the network side, wherein the PDCCH carries the second indication information; or, receiving a broadcast message from the network side, wherein the broadcast message carries the second indication information; or, receiving a RRC release message from the network side, wherein the RRC release message carries the second indication information.

Optionally, receiving the UL grant from the network side includes: receiving a Message 4 (Msg4) from the network side, wherein the Msg4 includes the UL grant.

Optionally, the Msg4 includes third indication information, the third indication information indicates one or more of following: whether a Media Access Control Control Element (MAC CE) of the Msg4 includes a field of the UL grant; whether the terminal can transmit the UL data using a configured grant.

Optionally, the third indication information is included in the MAC CE of the msg4; or, the third indication information is included in a RRC message, and the RRC message further includes the Msg4.

Optionally, the first threshold and/or the second threshold are configured by the network side.

Optionally, the first threshold is notified by a Random Access Response (RAR) message, or is notified by a broadcast message, or is notified by an RRC release message, or the first threshold is a transport block size of a configured grant resource in an inactive state; the second threshold is notified by an RRC release message or notified by a broadcast message.

Optionally, the first indication information is one of following: a preamble; a Buffer Status Report; a Data Radio Bearer (DRB) identifier and a data amount of UL data corresponding to a DRB; a DRB identifier; a service pattern.

In a second aspect, an indication method performed by a network-side device is provided in the embodiments of the present disclosure. The method includes: receiving first indication information from a terminal that is in a Radio Resource Control (RRC) idle state or an RRC inactive state, wherein the first indication information is configured to indicate that Uplink (UL) data of the terminal satisfies a first condition, the first condition includes one or more of the following:
  a data amount of the UL data is greater than a first threshold;
  a data amount of the UL data is less than a second threshold;
  a Data Radio Bearer (DRB) triggering a UL data transmission procedure is configured by the network side.

Optionally, the method further includes: sending a UL grant to the terminal, wherein the UL grant is configured for the terminal to send remaining of the UL data.

Optionally, sending the UL grant to the terminal includes: sending a first Random Access Response (RAR) to the terminal, the first RAR including a UL grant.

Optionally, the first RAR includes a first field, the first field indicates indication information about whether the first RAR includes the UL grant.

Optionally, a type of the first RAR is a fallback RAR or a success RAR.

Optionally, the UL grant is scheduled by a Physical Downlink Control Channel (PDCCH), and a random access radio network temporary identifier for scrambling the PDCCH is notified by the first RAR, or configured by a RRC release message.

Optionally, the method further includes: sending second indication information to the terminal, wherein the second indication information indicates that the terminal sends the UL data using a configured grant resource.

Optionally, sending the second indication information to the terminal include one of the following: sending a second Random Access Response RAR to the terminal, wherein the second RAR carries the second indication information; sending a Physical Downlink Control Channel (PDCCH) to the terminal, wherein the PDCCH carries the second indication information; sending a broadcast message to the terminal, wherein the broadcast message carries the second indication information; sending an RRC release message to the terminal, wherein the RRC release message carries the second indication information.

Optionally, sending the UL grant to the terminal includes: sending a Message 4 (Msg4) to the terminal, the Msg4 including the UL grant.

Optionally, the Msg4 includes third indication information, the third indication information indicates one or more of following: whether a Media Access Control Control Element (MAC CE) of the Msg4 includes a field of the UL grant; whether the UE can transmit the UL data using a configured grant.

Optionally, the third indication information is included in the MAC CE of the Msg4; or the third indication information is included in an RRC message, and the RRC message further includes the Msg4.

Optionally, the method further includes: sending the first threshold and/or the second threshold to the terminal through a RRC release message, a Random Access Response (RAR) message, or a broadcast message.

Optionally, the first indication information is one of the following: a preamble; a Buffer Status Report; a Data Radio Bearer (DRB) identifier and a data amount of UL data corresponding to a DRB; a DRB identifier; a service pattern.

In a third aspect, an indication device applied to a terminal is provided in the embodiments of the present disclosure. The indication device includes: a first sending module, configured to send first indication information to a network side when the terminal is in a Radio Resource Control (RRC) idle state or an RRC inactive state, the first indication information being configured to indicate that Uplink (UL) data of the terminal satisfies a first condition, wherein the first condition includes one or more of the following: a data amount of the UL data is greater than a first threshold; a data amount of the UL data is less than a second threshold; a Data Radio Bearer (DRB) triggering a UL data transmission procedure is configured by the network side.

Optionally, the indication device further includes a selecting module configured to select a first UL data transmission procedure, when the data amount of the UL data is less than the second threshold, or when the data amount of the UL data is greater than a first threshold and the data amount of the UL data is less than the second threshold, or, the UL data sent by the UE satisfies DRB configuration information configured by the network side, wherein the first UL data transmission procedure and an EDT procedure correspond to different preambles.

Optionally, the indication device further includes: a first receiving module configured to receive an UL grant from the network side; a second sending module configured to send the UL data according to the UL grant.

Optionally, the indication device further includes: a second receiving module configured to receive second indication information from the network side, wherein the second indication information indicates the terminal to send the UL data using a configured grant resource.

In a fourth aspect, a terminal is provided in the embodiments of the present disclosure, the terminal includes a first transceiver and a first processor, wherein the first transceiver transmits and receives data under a control of the first processor; the first processor reads a program in a memory to perform a following operation: sending first indication information to a network side when the terminal is in a Radio Resource Control (RRC) idle state or an RRC inactive state, the first indication information being configured to indicate that Uplink (UL) data of the terminal satisfies a first condition, wherein the first condition includes one or more of the following:
  a data amount of the UL data is greater than a first threshold;
  a data amount of the UL data is less than a second threshold;
  a Data Radio Bearer (DRB) triggering a UL data transmission procedure is configured by the network side.

Optionally, the first processor reads the program in the memory to further perform the following operation: selecting a UL data transmission procedure when the data amount of the UL data is less than the second threshold, or when the data amount of the UL data is greater than the first threshold and the data amount of the UL data is less than the second threshold, or when the UL data satisfies DRB configuration information configured by the network side, wherein the UL data transmission procedure and an Early Data Transmission (EDT) procedure correspond to different preambles.

Optionally, the first processor reads the program in the memory to further perform the following operation: receiving a UL grant from the network side; sending the UL data according to the UL grant.

Optionally, the first processor reads the program in the memory to further perform the following operation: receiving a first Random Access Response (RAR) from the network side, the first RAR including the UL grant.

Optionally, the first processor reads the program in the memory to further perform the following operation: receiving second indication information from the network side, wherein the second indication information indicates the terminal to send the UL data using a configured grant resource.

In a fifth aspect, an indication device applied to a network-side apparatus is provided in the embodiments of the present disclosure. The indication device includes: a third receiving module, configured to receive first indication information from a terminal that is in a Radio Resource Control (RRC) idle state or an RRC inactive state, wherein the first indication information is configured to indicate that Uplink (UL) data of the terminal satisfies a first condition, the first condition includes one or more of the following:
- a data amount of the UL data is greater than a first threshold;
- a data amount of the UL data is less than a second threshold;
- a Data Radio Bearer (DRB) triggering a UL data transmission procedure is configured by the network side.

Optionally, the indication device further includes a third sending module configured to send a UL grant to the terminal, the UL grant being configured for the terminal to send the remaining of the UL data.

Optionally, the indication device further includes a fourth sending module, configured to send second indication information to the terminal, wherein the second indication information indicates the terminal to send the UL data using a configured grant resource.

Optionally, the indication device further includes a fifth sending module, configured to send the first threshold and/or the second threshold to the terminal through an RRC release message, an RAR message or a broadcast message.

In a sixth aspect, a network-side device is provided in the embodiments of the present disclosure, the network-side device includes a second transceiver and a second processor, wherein the second transceiver transmits and receives data under a control of the second processor; the second processor reads a program in a memory to perform a following operation: receiving first indication information from a terminal that is in a Radio Resource Control (RRC) idle state or an RRC inactive state, wherein the first indication information is configured to indicate that Uplink (UL) data of the terminal satisfies a first condition, the first condition includes one or more of the following:
- a data amount of the UL data is greater than a first threshold;
- a data amount of the UL data is less than a second threshold;
- a Data Radio Bearer (DRB) triggering a UL data transmission procedure is configured by the network side.

Optionally, the second processor reads the program in the memory to perform the following operation: sending a first Random Access Response (RAR) to the terminal, the first RAR including a UL grant.

Optionally, the second processor reads the program in the memory to perform the following operation: sending second indication information to the terminal, wherein the second indication information indicates that the terminal sends the UL data using a configured grant resource.

Optionally, the second processor reads the program in the memory to perform the following operation: sending a Message 4 (Msg4) to the terminal, the Msg4 including the UL grant.

In a seventh aspect, a readable storage medium having stored thereon a program is provided in the embodiments of the present disclosure, wherein when the program is executed by a processor, the processor implements the steps of the method described above.

In the embodiments of the present disclosure, the terminal can avoid entering the RRC connection state by sending the first indication information to the network side, thereby effectively reducing the signaling overhead of the terminal.

BRIEF DESCRIPTION OF THE DRAWINGS

Various other advantages and benefits will become apparent to those of ordinary skills in the art upon reading the following detailed description of optional embodiments. The drawings are for a purpose of illustrating optional embodiments only and are not to be construed as limiting the present disclosure. The same reference numerals are used to denote the same parts throughout the drawings. In the drawings:

FIG. 5 is a schematic diagram of a fallback RAR format;

FIG. 6 is a flowchart of an indication method according to some embodiments of the present disclosure;

FIG. 7 is a second flowchart of an indication method according to some embodiments of the present disclosure;

FIG. 10 is a second schematic diagram of a first RAR according to First Embodiment of the present disclosure;

Figure 1:
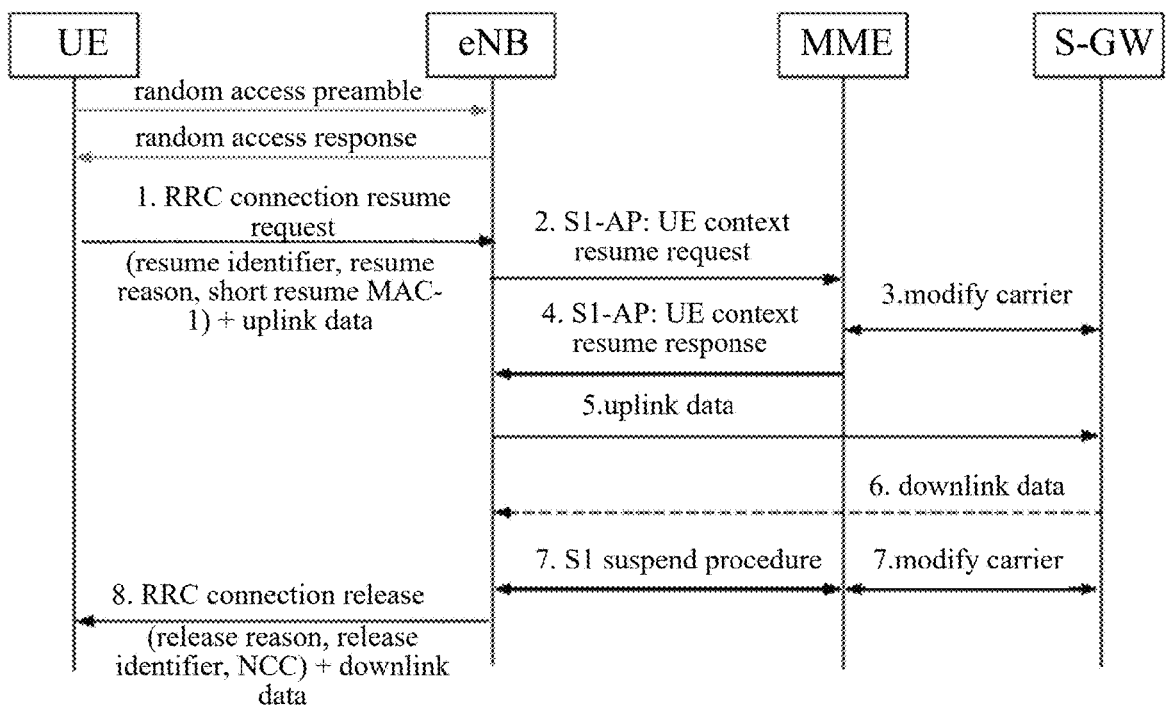
FIG. 1 is a schematic diagram of EDT data transmission in the related art.

DETAILED DESCRIPTION (1) about an Early Data Transmission (EDT) Data Transmission Process:

As shown in FIG. 1, in the EDT data transmission process in the related art, steps are as follows:
 Step 1 (Random Access Preamble): the UE sends a preamble;
 Step 2: the UE receives a random access response (Random Access Response, RAR), wherein the RAR includes an uplink (UpLink, UL) grant;
 Step 3 (1. RRC Connection Resume Request in FIG. 1): the UE sends a Radio Resource Control (RRC) Connection Resume Request message according to the UL grant sent by the RAR, and carries UL data;
 Step 4 ("8. RRC Connection Release" in FIG. 1) the UE receives the RRC Connection Release (RRC Connection Release) message and continues to maintain the RRC inactive (inactive) state.

Figure 2:
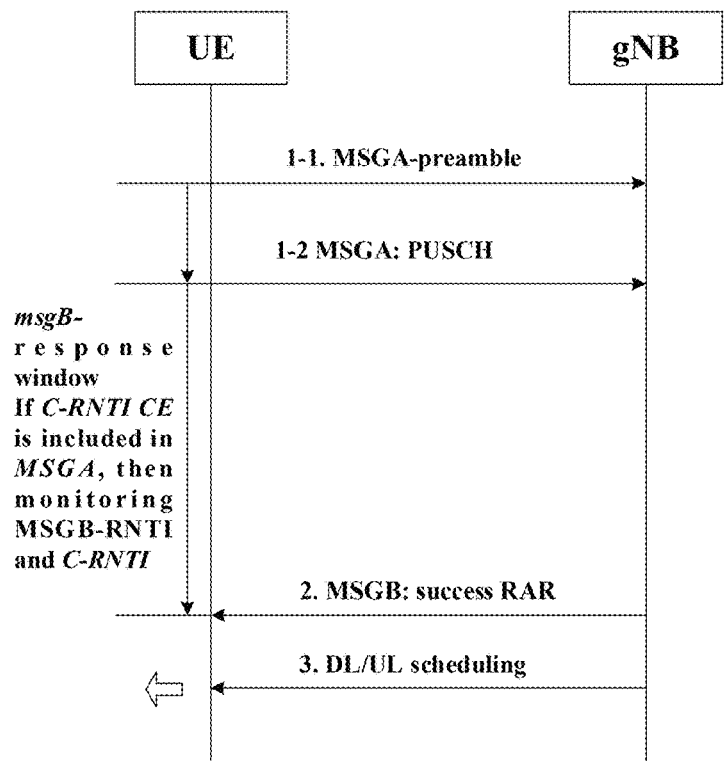
FIG. 2 is a schematic diagram of a success RAR received by a UE in a 2-step RACH.
Figure 3:
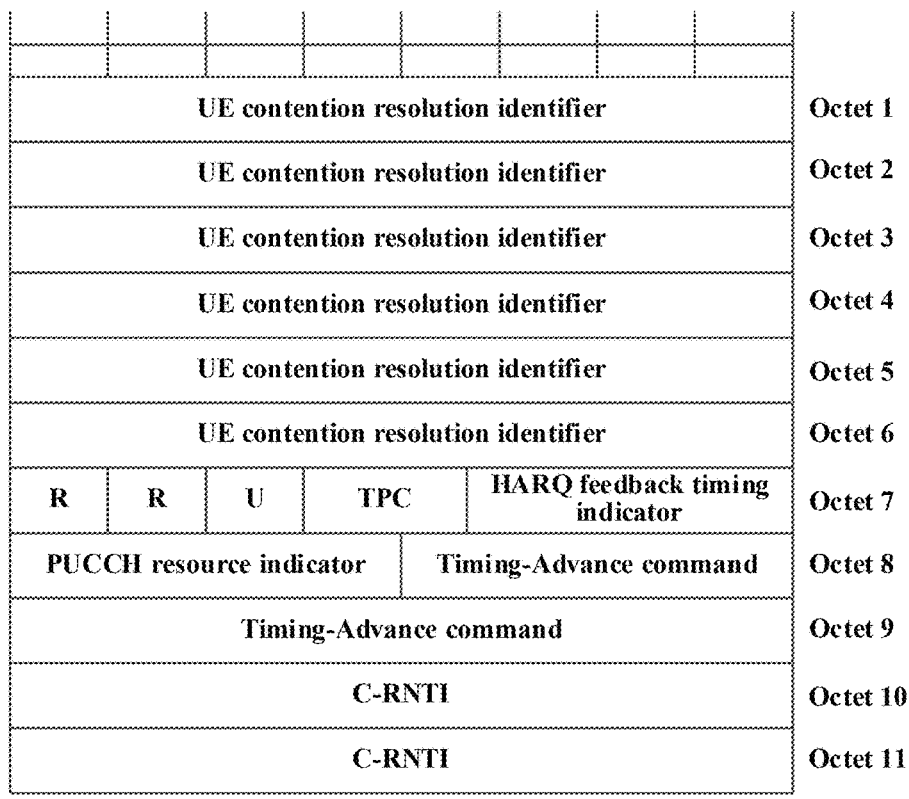
FIG. 3 is a schematic diagram of a success RAR format.
Figure 4:
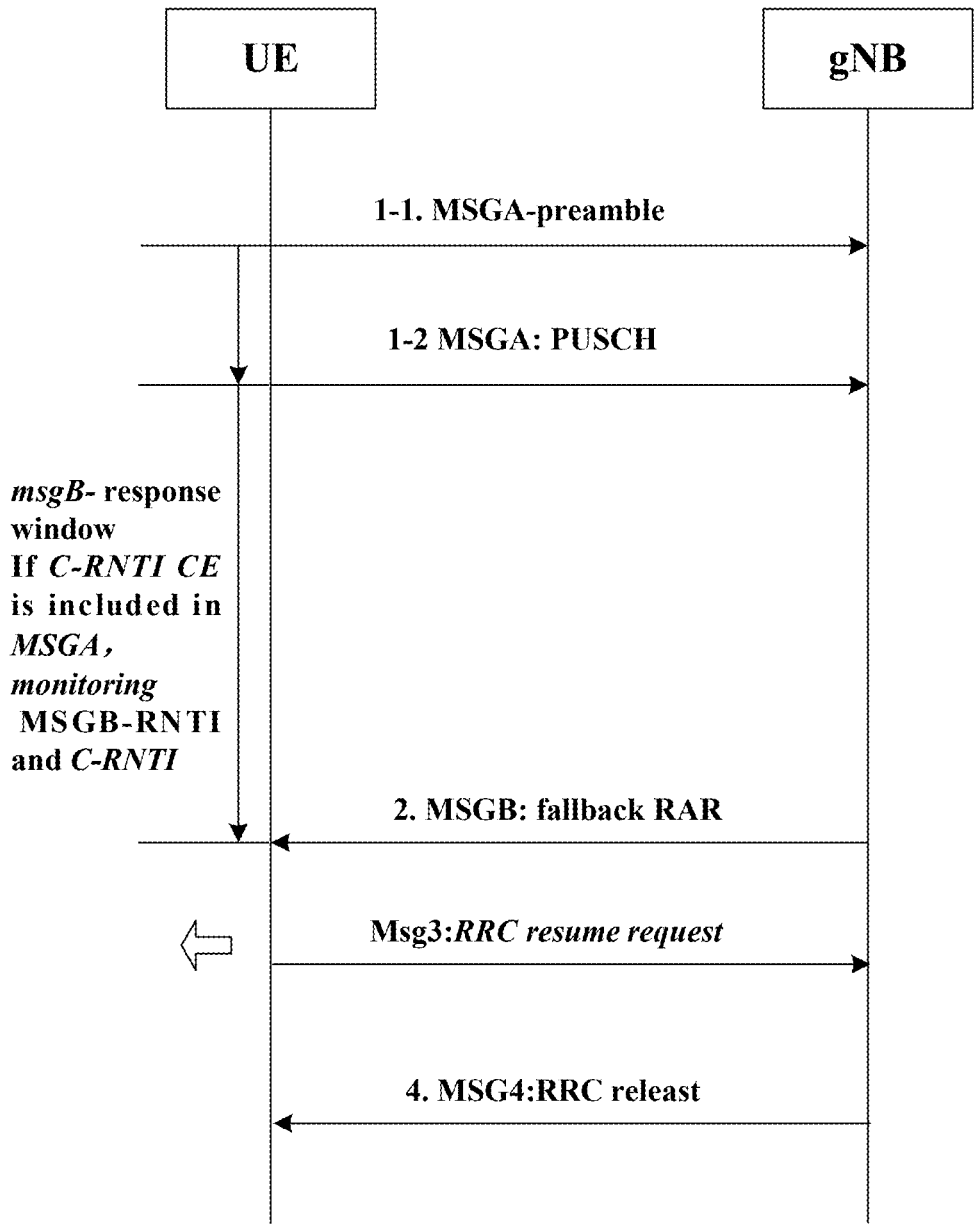
FIG. 4 is a schematic diagram of UE receiving a fallback RAR.

(2) About Two-Step Random Access (2-Step RACH):

In the 2-step RACH, the 4-step RACH in the related art is combined into 2 steps. There are mainly 2 processes.
Process 1: Referring to FIG. 2, the UE Receives a Success RAR.
 Step 1: the UE sends a message A (MsgA), where the MsgA includes a preamble and a physical uplink shared channel (Physical Uplink Shared Channel, PUSCH). The preamble is different from the preamble of the 4-step random access procedure. The PUSCH carries data of the UE, for example, when the UE is in an idle state (IDLE), the PUSCH may carry an RRC establishment request, an RRC resume request; when the UE is in a connected state, the PUSCH may carry a Cell Radio Network Temporary Identifier (C-RNTI) of the UE, etc. After sending the PUSCH in the MsgA, the UE will open a timer message B response window (MsgB-responseWindow).
 Step 2: the UE monitors the MsgB. The UE will monitor a Physical Downlink Control Channel (PDCCH) scrambled by a MsgB-RNTI.
 If a base-station side receives the preamble and the PUSCH, the base station will reply a success RAR to the UE. The format of the RAR is shown in FIG. 3.
 If the UE receives the success RAR, the UE will judge whether a UE contention Resolution identity in the success RAR matches the UE. If there is a match, the MsgB is successfully received. The UE will enter a connected state.
Process 2: Referring to FIG. 4, the UE Receives a Fallback RAR.
 Step 1: the UE sends a MsgA. The MsgA includes a preamble and a PUSCH.
 The preamble is different from the preamble in the 4-step random access procedure. The PUSCH carries data of the UE, for example, when the UE is in the IDLE state, the PUSCH may carry the RRC establishment request and the RRC resume request; when the UE is in the connected state, the PUSCH may carry the C-RNTI of the UE, etc. After sending the PUSCH in the MsgA, the UE will start the timer MsgB-responseWindow.
 Step 2: the UE monitors the MsgB. The UE will monitors a PDCCH scrambled by the MsgB-RNTI. If the base-station side receive the preamble but fails to receive the PUSCH in the MsgA, then the base station reply the fallback RAR to the UE. The format of the fallback RAR is shown in FIG. 5. Under this condition, the UE will enter the 4-step random access procedure.
 Step 3: the UE sends a message 3 (Msg3), wherein the contents in the Msg3 is the same as the contents carried by the PUSCH in the MsgA; if a size of the UL grant in the fallback RAR is different from the size of the Media Access Control (MAC) Protocol Data Unit (PDU) in MsgA, then the UE determines whether to reconstruct a data packet.
 Step 4: the UE receives a message 4 (Msg4).
 It should be noted that the step 4 is consistent with the random access procedure in the related art.

The technical solutions in the embodiments of the present disclosure will be clearly and completely described below with reference to the drawings in the embodiments of the present disclosure. Obviously, the described embodiments are part of the embodiments of the present disclosure, rather than all of the embodiments. Based on the embodiments in the present disclosure, all other embodiments obtained by those skilled in the art without paying creative work belong to the protection scope of the present disclosure.

Such terms as "including" or "comprising" in the specification and claims of the present application, together with any variations thereof, are intended to cover non-exclusive inclusion, for example, processes, methods, systems, products or devices including a series of steps or units need not be limited to those steps or units that are clearly listed, but may include other steps or elements that are not explicitly listed or inherent to the processes, the methods, products or devices. In addition, usage of "and/or" in the specification and claim means at least one of objects connected by the word, such as A and/or B indicates that there are three cases, i.e., A alone exists, B exists alone, and both A and B exist.

In the embodiments of the present disclosure, such words as "exemplary" or "for example" are used to indicate an example, illustration or description. Any embodiment or design described as "exemplary" or "for example" in the embodiments of the present disclosure should not be construed as being more optional or advantageous than other embodiments or designs. Rather, usage of the words "exemplary" or "for example" is intended to present relevant concepts in a specific manner.

The techniques described herein are not limited to Long Time Evolution (LTE)/LTE-Advanced (LTE-A) systems, and may also be used in various radio communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems.

Terms 'system' and 'network' are often used interchangeably. CDMA systems may implement radio technologies such as CDMA2000, Universal Terrestrial Radio Access (UTRA), and the like. UTRA includes Wideband Code Division Multiple Access (WCDMA) and other CDMA variants. The TDMA system may implement radio technologies such as Global System for Mobile Communications (GSM) and the like. The OFDMA system may implement radio technologies such as Ultra Mobile Broadband (UMB), Evolution-UTRA (E-UTRA), IEEE 802.11 (Wireless Fidelity (Wi-Fi), IEEE 802.16 (World Interoperability for Microwave Access, WiMAX), IEEE 802.20, Flash-OFDM, etc. UTRA and E-UTRA are part of a Universal Mobile Telecommunications System (UMTS). LTE and more advanced LTE (e.g. LTE-A) are new UMTS versions using E-UTRA. UTRA, E-UTRA, UMTS, LTE, LTE-A, and GSM are described in documents from an organization called Third Generation Partnership Project (3GPP). CDMA2000 and UMB are described in documents from an organization called Third Generation Partnership Project 2 (3GPP2). The techniques described herein may be used for both the systems and radio technologies mentioned above and for other systems and radio technologies.

Referring to FIG. 6, the embodiments of the present disclosure provide an indication method, an entity of performing the method may be a UE, and the specific step may include a step 601:

Step 601: when a UE is in an RRC idle state or an RRC inactive state, sending first indication information to a network side, wherein the first indication information is used to indicate that UL data of the UE satisfies a first condition.

wherein the first condition includes one or more of following:

(1) a data amount of UL data is greater than a first threshold;

(2) a data amount of UL data is less than a second threshold;

(3) a data amount of UL data is greater than a first threshold, and the data amount of the UL data is less than a second threshold.

Optionally, the first threshold and/or the second threshold may be configured by the network side. Optionally, the first threshold is notified by an RAR message or notified by a broadcast message, or an RRC release message, or the first threshold is a transport block size of a configured grant resource in an inactive state; the second threshold is notified by an RRC release message or a broadcast message.

(4) a Data Radio Bearer (DRB) triggering a UL data transmission procedure is configured by the network side.

In the embodiments of the present disclosure, the first indication information may be one of following:

(a) a preamble;

(b) Buffer Status Report (BSR);

(c) a DRB identifier and a data amount of UL data corresponding to a DRB;

(d) a DRB identifier (DRB ID);

(e) a service pattern, for example, the service pattern may represent information such as a packet size of a service and a time interval of packets.

In some embodiments, when the data amount of the UL data is less than the second threshold; or the data amount of the UL data is greater than a first threshold and the data amount of the UL data is less than the second threshold; or, the UL data sent by the UE satisfies DRB configuration information configured by the network side, a UL data transmission procedure is selected, the UL data transmission procedure and an EDT procedure correspond to different preambles.

For example, the preamble corresponding to the EDT procedure is a Preamble resource 1, and the preamble corresponding to the UL data transmission procedure is a Preamble resource 2.

In some embodiments, after transmitting the first indication information to the network side, the UE receives a UL grant from the network side, and transmits the UL data according to the UL grant.

In some embodiments, manners of receiving the UL grant from the network side include a manner 1 and a manner 2.

Manner 1: receiving a first RAR from a network side, the first RAR including a UL grant.

In some embodiments, the first RAR includes a first field, the first field indicates indication information about whether the first RAR includes the UL grant.

Optionally, the type of the first RAR is a fallback RAR (fallback RAR) or a success RAR (success RAR).

Optionally, the fallback RAR may not include a temporary cell-level radio network temporary identifier (Temporary C-RNTI, TC-RNTI) or the TC-RNTI in the fallback RAR is the radio network temporary identifier (RNTI) provided in the RRC release.

Optionally, the UL grant is scheduled by a Physical Downlink Control Channel (PDCCH), and a random access radio network temporary identifier for scrambling the PDCCH is notified by the first RAR, or configured by the RRC release message.

In some embodiment, that method further includes: receiving second indication information from a network side, wherein the second indication information indicates that the terminal sends the UL data using a configured grant resource.

For example, the manner of receiving the second indication information from the network side includes one of the following:

(1) receiving a second RAR from the network side, wherein the second RAR carries second indication information; it can be understood that the second RAR may be the same RAR as the first RAR, or may be a RAR different from the first RAR;

(2) receiving the PDCCH from the network side, wherein the PDCCH carries the second indication information; and (3) receiving a broadcast message from the network side, wherein the broadcast message carries the second indication information;

(4) receiving an RRC release message from the network side, wherein the RRC release message carries the second indication information.

Manner 2: receiving a Msg4 from the network side, wherein the Msg4 includes the UL grant.

Optionally, the Msg4 includes third indication information, wherein the third indication information indicates one or more of following:

(1) whether a Media Access Control Control Element (MAC CE) of the Msg4 includes a field of the UL grant;

(2) whether the UE can transmit the UL data using a configured grant.

In some embodiments, the third indication information is included in a MAC CE of the Msg4; in other embodiments, the third indication information is included in an RRC message, and the RRC message further includes the Msg4, that is, the third indication information and the Msg4 are multiplexed in the RRC message.

In the embodiments of the present disclosure, a signal overhead for a UE entering the connected state can be effectively reduced.

Referring to FIG. 7, some embodiments of the present disclosure provide an indication method, an entity for performing the method may be a network-side device, and a specific step includes a step 701.

Step 701: receiving first indication information from a terminal which is in an RRC idle state or an RRC inactive state, wherein the first indication information is configured to indicate that UL data of the terminal satisfies a first condition.

wherein the first condition includes one or more of following:
(1) a data amount of UL data is greater than a first threshold;
(2) a data amount of UL data is less than a second threshold;
(3) a data amount of UL data is greater than a first threshold, and the data amount of the UL data is less than a second threshold;
  optionally, the first threshold and/or the second threshold may be configured by the network side; optionally, the first threshold and/or the second threshold are notified to the UE by the network-side device through an RAR message or a broadcast message, or an RRC release message;
(4) a Data Radio Bearer (DRB) triggering a UL data transmission procedure is configured by the network side.

In the embodiments of the present disclosure, the first indication information may be one of following:
(a) a preamble;
(b) a Buffer Status Report (BSR);
(c) a DRB identifier and a data amount of UL data corresponding to a DRB;
(d) a DRB identifier (DRB ID);
(e) a service pattern.

In some embodiments, that method further includes: sending a UL grant to the terminal, wherein the UL grant is configured for the terminal to send remaining of the UL data.

Optionally, manners of sending the UL grant to the terminal by the network-side device includes a manner 1 and a manner 2.

Manner 1: sending a first RAR to the terminal, the first RAR including the UL grant.

Optionally, the first RAR includes a first field, the first field indicates indication information about whether the first RAR includes the UL grant.

Optionally, the type of the first RAR is a fallback RAR (fallback RAR) or a success RAR (success RAR).

Optionally, the UL grant is scheduled by a PDCCH, and a random access radio network temporary identifier for scrambling the PDCCH is notified by the first RAR, or configured by the RRC release message.

In some embodiments, the method further includes: sending second indication information to the terminal, wherein the second indication information indicates that the terminal sends the UL data using a configured grant resource.

For example, the manner of sending the second indication information to the terminal includes one of the following:
(1) sending a second RAR to the terminal, wherein the second RAR carries second indication information; it can be understood that the second RAR may be the same RAR as the first RAR, or may be a RAR different from the first RAR;
(2) sending the PDCCH to the terminal, wherein the PDCCH carries the second indication information;
(3) sending a broadcast message to the terminal, wherein the broadcast message carries the second indication information;
(4) sending an RRC release message to the terminal, wherein the RRC release message carries the second indication information.

Manner 2: sending a Msg4 to the terminal, wherein the Msg4 includes the UL grant.

Optionally, the Msg4 includes third indication information, wherein the third indication information indicates one or more of following:
(1) whether a MAC CE of the Msg4 includes a field of the UL grant;
(2) whether the UE can transmit the UL data using a configured grant.

In some embodiments, the third indication information is included in a MAC CE of the Msg4; in other embodiments, the third indication information is included in an RRC message, and the RRC message further includes the Msg4, that is, the third indication information and the Msg4 are multiplexed in the RRC message.

In the embodiments of the present disclosure, a signal overhead for a UE entering the connected state can be effectively reduced.

Figure 8:
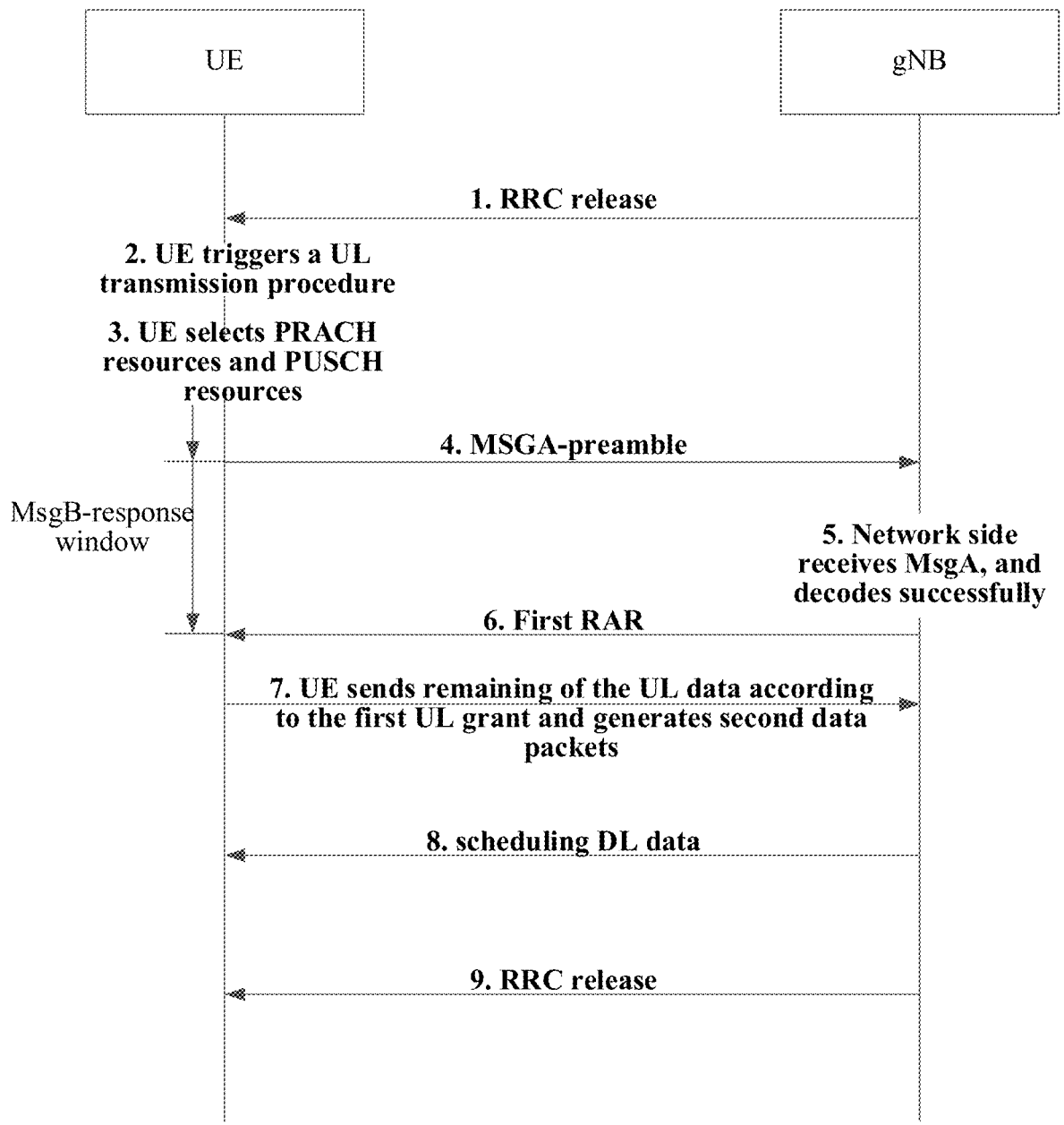
FIG. 8 is a flowchart of First Embodiment of the present disclosure.

First Embodiment when the base station feeds back the success RAR in the 2-step RACH, the success RAR carries the UL grant, and the UE sends the remaining of the UL data according to the UL grant, as shown in FIG. 8.

Step 1: the UE receives an RRC release message, where the RRC release message indicates that the UE enters the RRC inactive state.

Optionally, after the UE receives the RRC release message, the UE may receive one or more of the following:
(1) security parameters, such as Next hop Chaining Counter (NCC);
(2) preamble information used by the 2-step RACH, for example, one or more of the following are included: a Preamble identifier (Identity, ID), a Physical Random Access Channel (PRACH) transmission occasion, and Mask information;
(3) PUSCH configuration information, such as PUSCH configuration information includes one or more of the following: a Subcarrier spacing (SCS), a PUSCH duration, a Modulation and coding scheme (MCS), and frequency modulation information; Pilot information and the like;
(4) threshold information of UL data size, optionally, the threshold information includes 2 thresholds, which are a first threshold and a second threshold.

Optionally, the above information (1) to (4) may be transmitted through an RRC Release message, or may be transmitted through a broadcast message.

Step 2: the UE triggers an UL-data sending procedure when data of the UE arrives.

Optionally, the UE compares a threshold of the UL data, and when the data amount of the UL data is less than the first threshold, the UE selects to perform the EDT procedure.

If the data amount of the UL data is less than the second threshold, or the data amount of the UL data is greater than the first threshold, and the data amount of the UL data is less than the second threshold, a UL data transmission procedure is selected.

Optionally, when the UL data transmitted by the UE satisfies configuration information of a Data Radio Bearer (DRB) configured by the network side, the first UL sending process is selected.

Step 3: the UE selects a UL resource.

Optionally, the UL resource may be a PRACH resource or a PUSCH resource.

Optionally, when the UL resource is the PRACH resource, the UE selects a preamble;

The UE selects the preamble according to a preamble resource configured by the network side, optionally, the preamble corresponding to the EDT is a Preamble resource 1, and the first UL sending process corresponds to a Preamble resource 2.

The UE selects a PRACH occasion according to a PRACH resource configured in step 1, and optionally, the PRACH occasion may correspond to the EDT procedure or the PRACH occasion may correspond to a simplified UL data transmission procedure.

The UE selects a PRACH resource according to the UL data information, or selects a PUSCH resource according to the UL data information. The UL data information includes one or more of the following: a size of UL data, the type of UL data, delay requirement of UL data, bearer information of UL data, and the like.

Step 4: the UE sends the selected preamble on the selected PRACH resource, and sends first UL data on the selected PUSCH resource.

Wherein the first UL data includes one or more of following:

(1) an indication of an uplink data amount, wherein the indication of the uplink data amount indicates a size of a data amount of UL data, such as a Buffer Status Report (BSR), or indicates an interval of the data amount;

(2) an inactive state RNTI (Inactive RNTI, I-RNTI), which indicates the network side to send an identifier of the inactive UE, the identifier is used for distinguishing the UE;

(3) a RRC Resume Request.

(4) partial UL data; the UL data may be multiplexed into a Non-Access-Stratum (NAS) message and sent to the network side in a RRC signaling.

A signaling structure of the RRC signaling is:

a RRC Resume Request:

dedicatedInfoNas (including UL user-plane data therein);

ResumeID;

Short Resolution MAC-I;

Recovery Cause.

It can be understood that the UL data can also be sent to the base station in a form of DRB alone by being multiplexed together with a RRC message. A packet format is: MAC header|RLC Header|PDCP header|RRC Resume Request|MAC header|RLC Header|PDCP header|UL data.

It is understood that an UL data and a RRC Resolution Request may be in a juxtaposed relationship with each other.

Step 5: the network side receives the MsgA of the UE and decodes the MsgA successfully.

After receiving the RRCResumeRequest of the MsgA, the network side decodes the uplink data indication in the MsgA, judges that the UE will have a small amount of UL data to send, and then the network side allocates a UL grant to the UE according to the UL data indication.

Step 6: the UE receives the first RAR sent by the network side.

The first RAR includes a SuccessRAR and a first UL grant.

Figure 9:
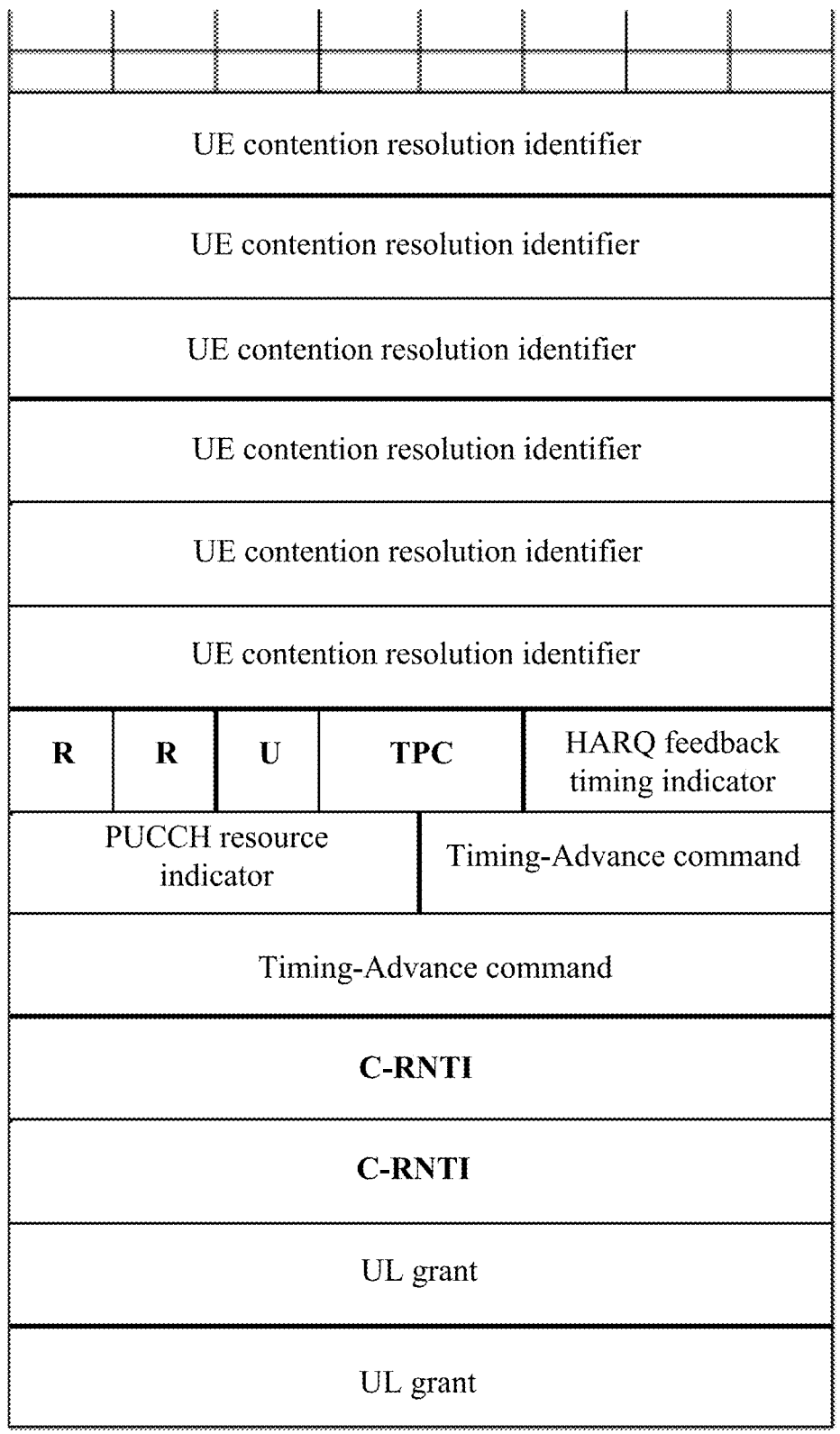
FIG. 9 is a first schematic diagram of a first RAR according to First Embodiment of the present disclosure.

As shown in FIG. 9, a 'U' bit is used to indicate whether there is a UL grant field. If U=1, then it indicates that there is an UL grant field in the first RAR, the UE will send on the UL grant indicated by the first RAR. If U=0, then it indicates that there is no UL grant field in the first RAR.

Optionally, the first RAR may further include one or more of the following:

(1) a first RNTI, which may be an RNTI carried in an RRCRrelease message.

(2) a Hybrid Automatic Repeat reQuest feedback timing indicator which represents a UL feedback time indication of the UE for the MsgB.

It should be noted that, when the first RAR does not include a PUCCH resource indicator, a format of the first RAR is shown in FIG. 10.

Step 7: the UE sends the remaining of the UL data on the first UL grant to generate a second data packet.

Optionally, the UE continues to send the UL data indication to notify the data amount of the remaining of the UL data.

Optionally, the RNTI scheduling the second data packet is the first RNTI.

Step 8: gNB schedules DL data.

If the network side has DL data, the network side will schedule the DL data using the first RNTI.

The DL data may be an RRCRelease message carrying a suspend indication.

Step 9: the UE receives the RRRelease message.

After receiving the RRCRelease message, the UE enters the RRC inactive state.

Second Embodiment

Figure 11:
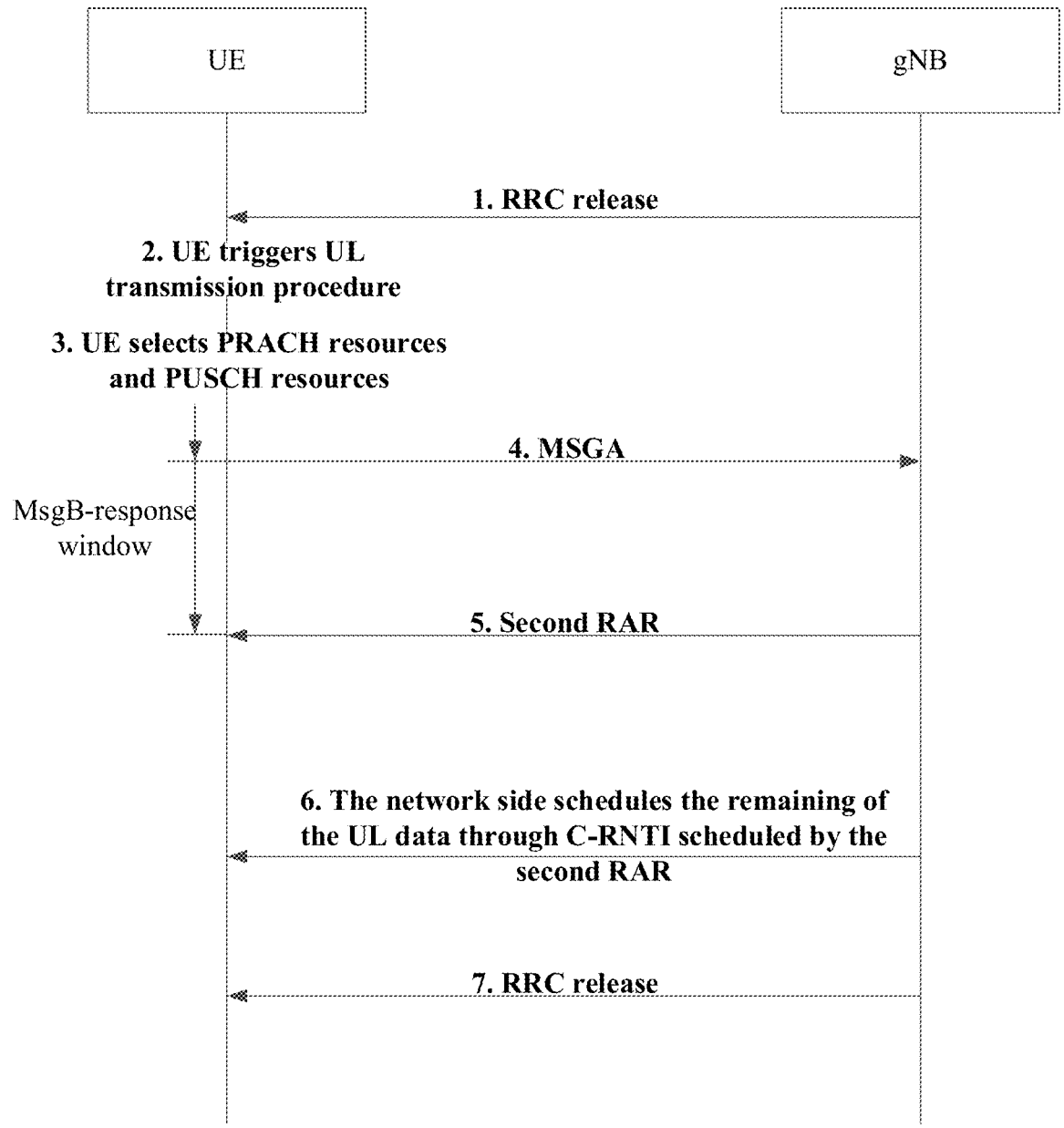
FIG. 11 is a flowchart of Second Embodiment of the present disclosure.

The difference between the Second Embodiment and the First Embodiment is that the network side uses the C-RNTI of the first RAR, and after receiving the first RAR, the UE continues to maintain the inactive state and sends the UL grant, as shown in FIG. 11.

For the description of step 1 to step 4, reference may be made to step 1 to step 4 in First Embodiment.

Step 5: the network side determines the amount of the UL data according to according to the uplink data indication in the MsgA or a bearer type of the multiplexed UL data in the MsgA, and sends the second RAR to the UE.

Figure 12:
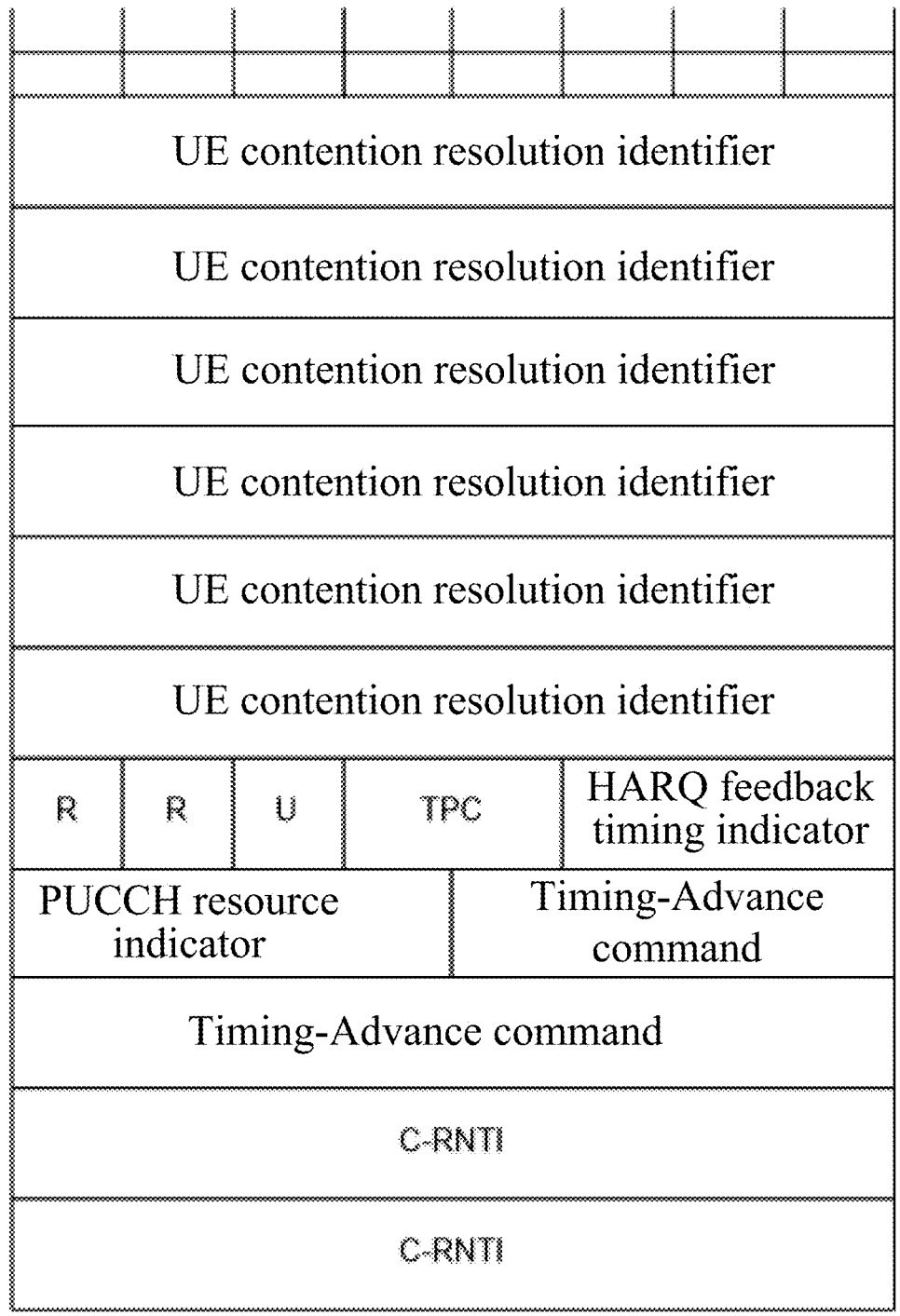
FIG. 12 is a schematic diagram of a second RAR in Second Embodiment of the present disclosure.

Optionally, the format of the second RAR is shown in FIG. 12, wherein 'U' indicates that there is no UL grant field in the fields of the second RAR.

Step 6; the network side schedules the remaining of the UL data of the UE through the C-RNTI sent by the second RAR.

Optionally, the search space used for network-side scheduling is sent in an RRC Release message.

Step 7: the UE receives the RRCRelease message.

After receiving the RRCRelease message, the UE enters the RRC active state.

Third Embodiment

Figure 13:
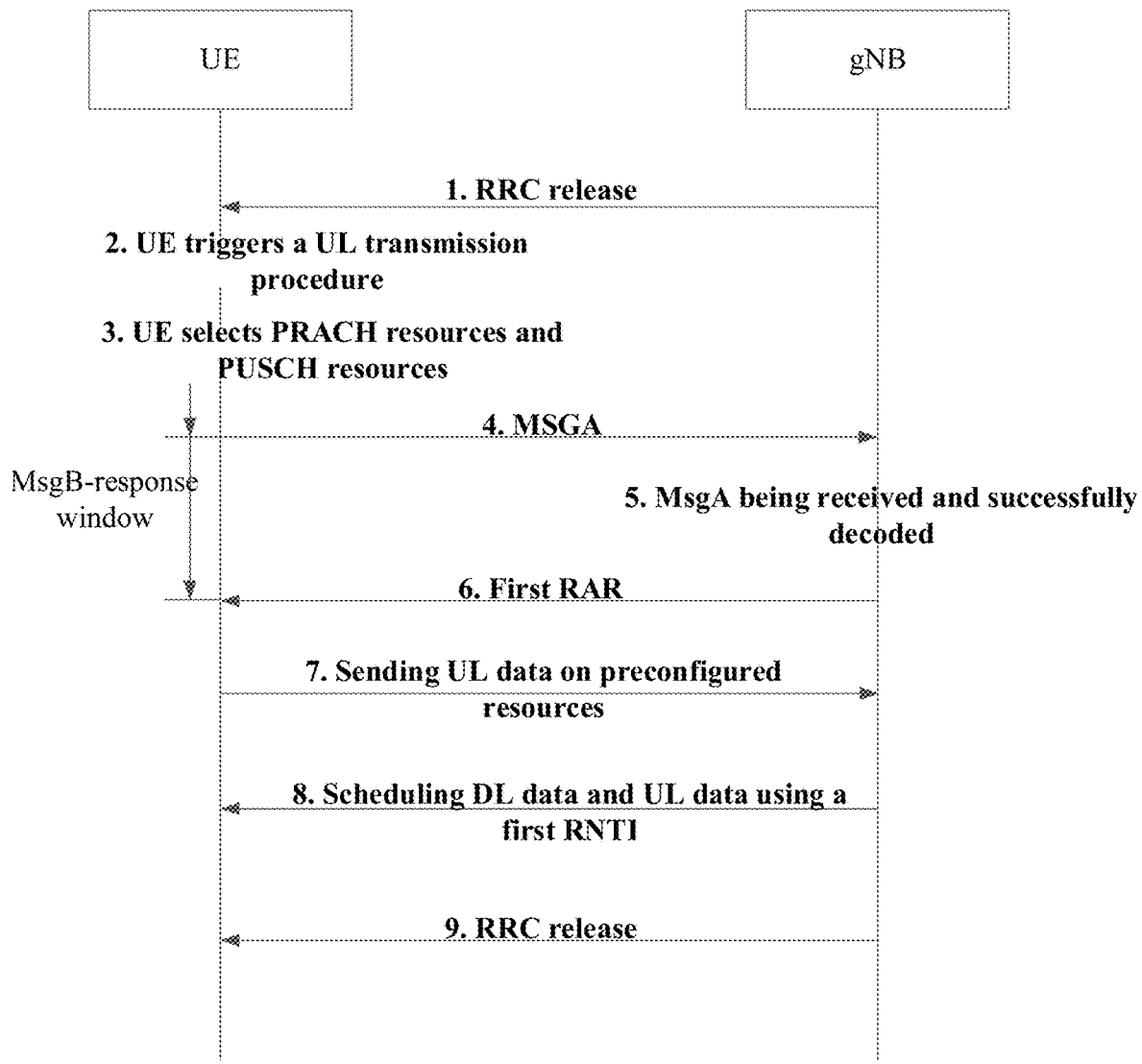
FIG. 13 is a flowchart of Third Embodiment of the present disclosure.

The difference between the Third Embodiment and the First Embodiment is that the network side instructs the UE to transmit the remaining of the UL data through a pre-configured resource, as shown in FIG. 13.

For the description of steps 1-4, reference may be made to steps 1-4 in First Embodiment.

Step 5: the network side receives the MsgA, successfully decodes the MsgA, and instructs, in the MsgB according to the UL data indication, the UE to send UL data on a pre-configured resource.

Step 6: the UE receives the first RAR sent by the network side.

The first RAR includes an indication indicating that the UE uses the pre-configured resource.

Optionally, the pre-configured resource is indicated through an RRC Release message.

Step 7: the UE sends UL data on the pre-configured resource.

For the description of step 8 and step 9, reference may be made to step 8 and step 9 in the First Embodiment.

Fourth Embodiment

Figure 14:
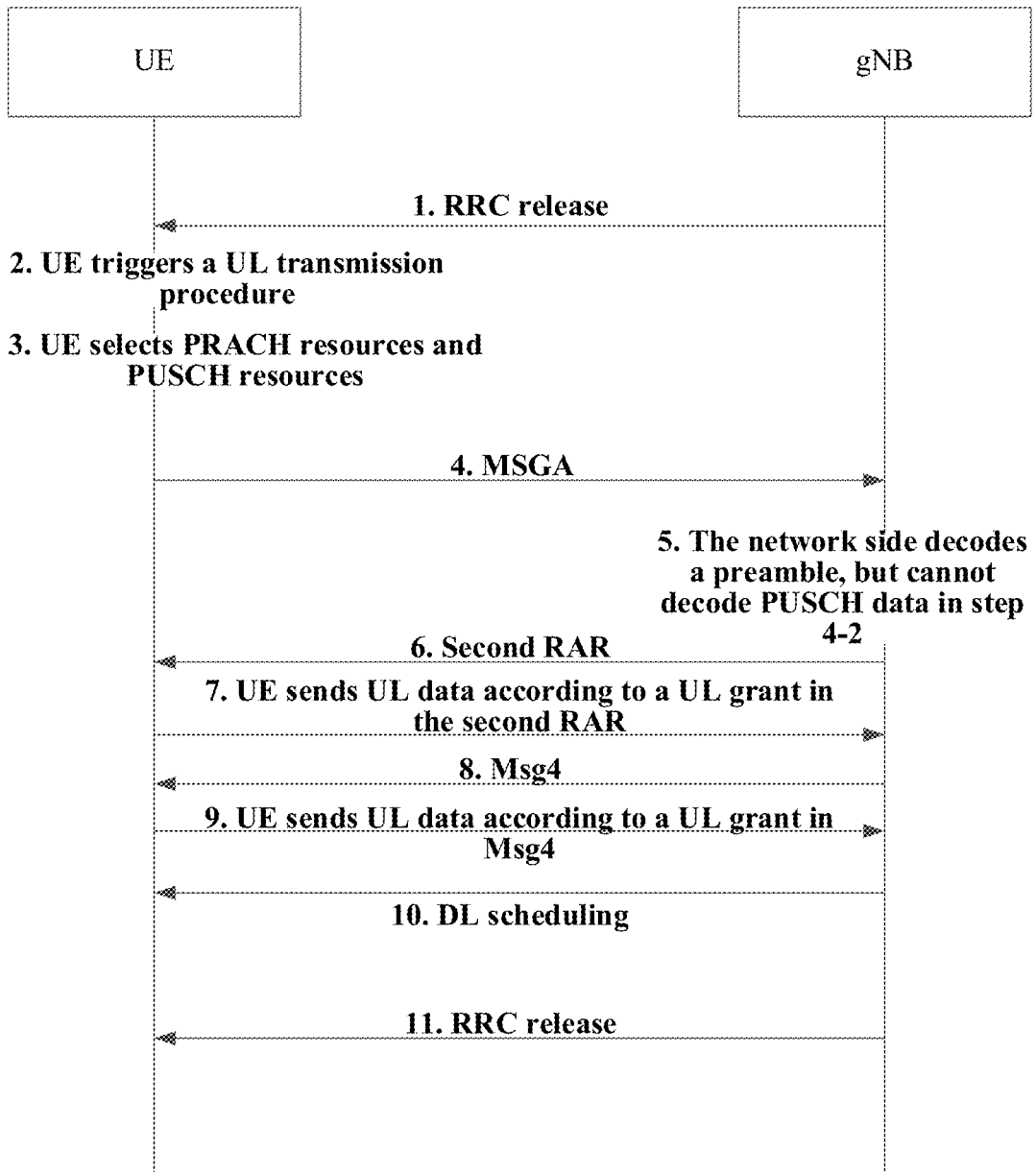
FIG. 14 is a flowchart of Fourth Embodiment of the present disclosure.

When the network side feeds back the fallback RAR, the UL grant is provided in the Msg4, as shown in FIG. 14.

For the description of steps 1-4, reference may be made to steps 1-4 in First Embodiment.

Step 5: the network side decodes the Preamble, but cannot decode PUSCH data in step 4.

The network side acquires, from preamble information, that the UE performs the 2-step random access procedure, and judges that the UE triggers the UL data transmission procedure.

Step 6: the network side feeds back the second RAR.

Figure 15:
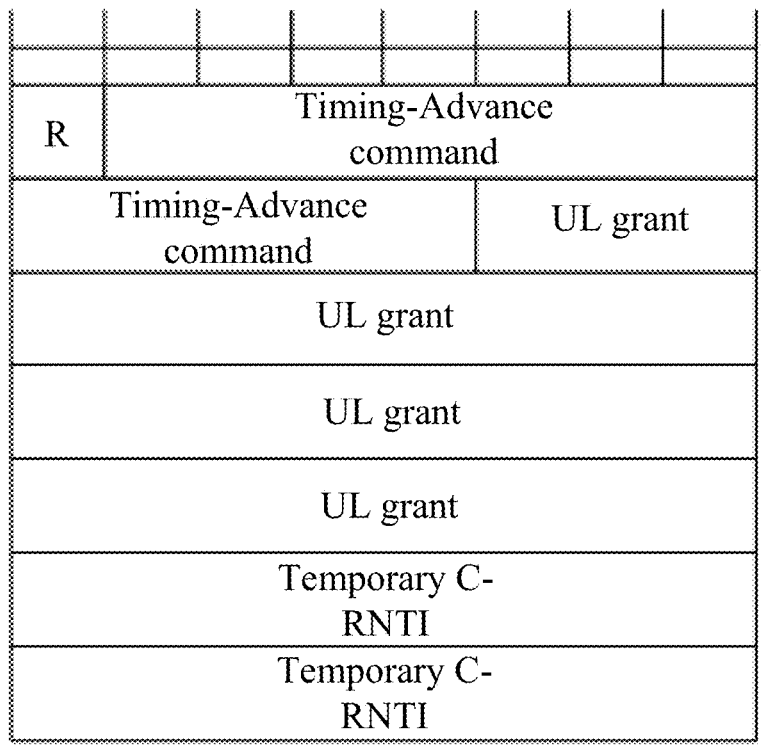
FIG. 15 is a schematic diagram of a second RAR in Fourth Embodiment of the present disclosure.

Optionally, the second RAR is the fallback RAR, see FIG. 15.

Optionally, TC-RNTI (Temporary C-RNTI) may not be included in the fallback RAR.

Step 7: the UE sends UL data according to the UL grant in the second RAR, the UL data including the first UL data in step 4.

Optionally, the first UL data may also be reconstructed, such as deleting DRB data therein, or adding more DRB data. The amount of data depends on the size of the UL grant.

Optionally, the C-RNTI fed back by the UE in the Msg3 may be the RNTI sent by the network side in the RRC Release message, instead of the T-RNTI in the Fallback RAR.

Step 8: the network side feeds back the Msg4.

Figure 16:
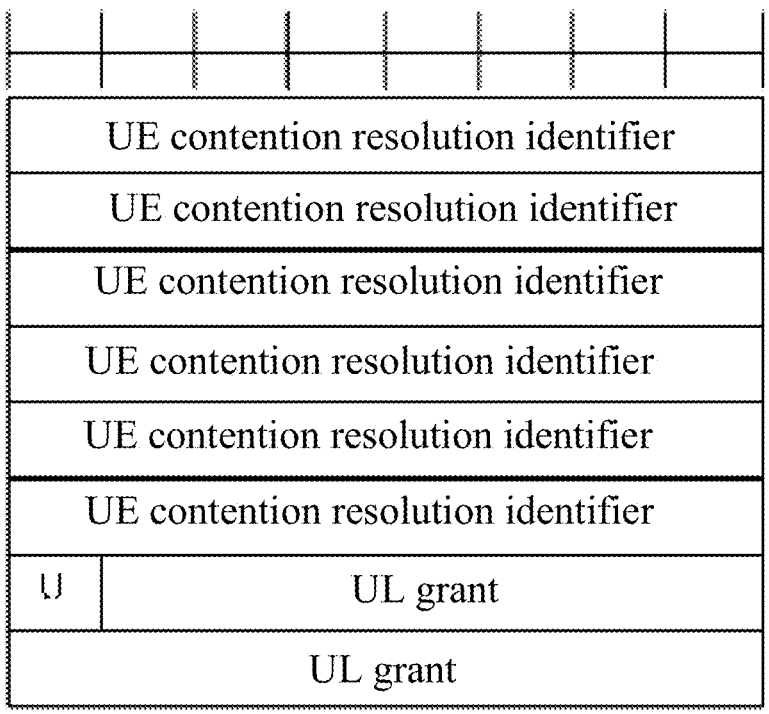
FIG. 16 is a schematic diagram of an Msg4 format in Fourth Embodiment of the present disclosure.

A format of the Msg4 can be seen in FIG. 16.

The 'U' bit is used to indicate whether there is UL grant.

Optionally, the U bit may be on the MAC subhead, or may be on a bit defined by a contention resolution MAC CE.

Optionally, the network side may also instruct, through the RRC message multiplexed with the Msg4, the UE to schedule a subsequent UL transmission according to the Temporary-RNTI indicated by the RAR.

Step 9: the UE sends UL data according to the UL grant of Msg4.

For the description of step 10 and step 11, reference may be made to step 8 and step 9 in the First Embodiment.

Fifth Embodiment

Figure 17:
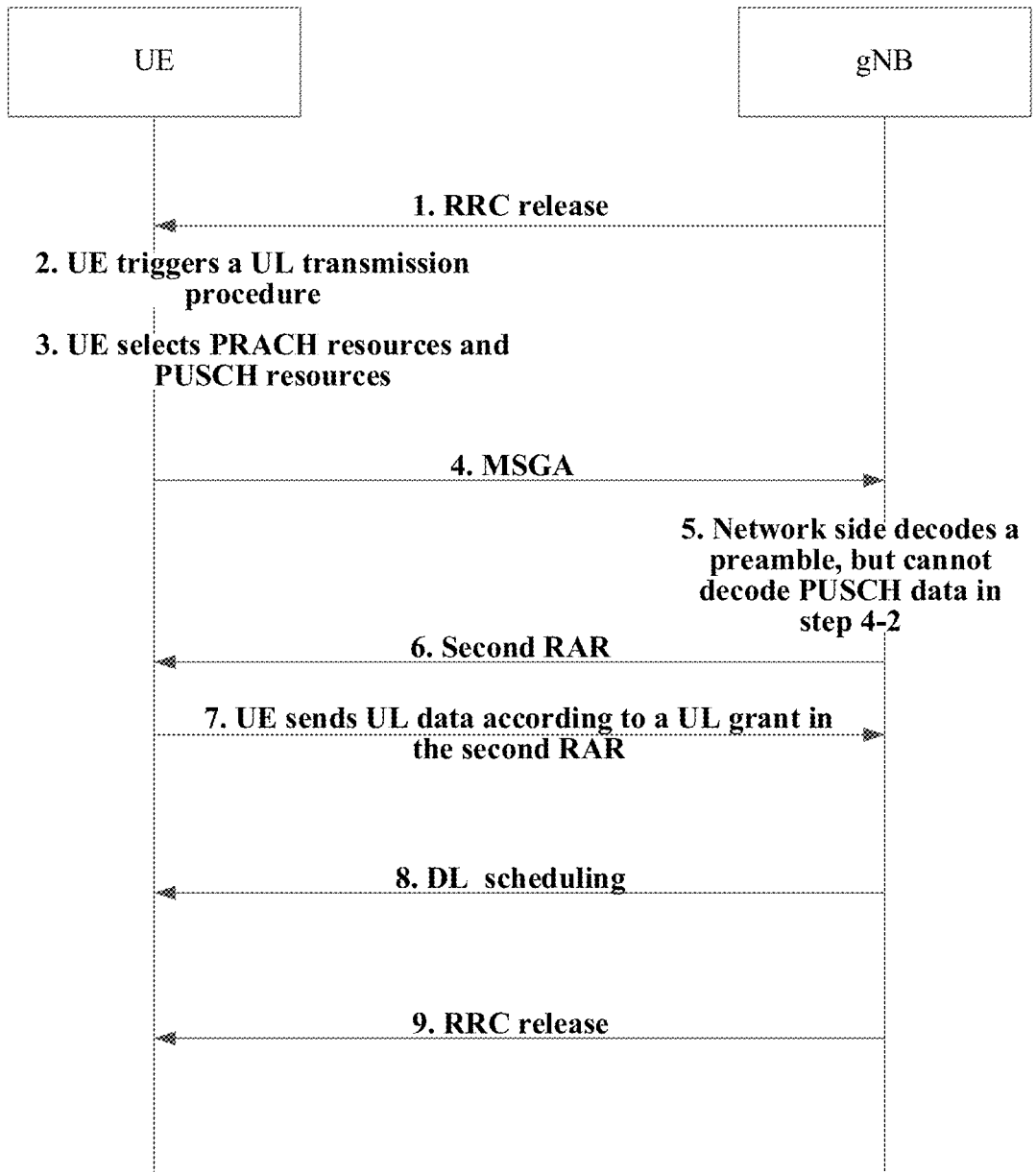
FIG. 17 is a flowchart of Fifth Embodiment of the present disclosure.

When the network side feeds back the fallback RAR, the TC-RNTI in the fallback RAR is the RNTI provided in the RRC release, as shown in FIG. 17.

For the description of steps 1-4, reference may be made to steps 1-4 in First Embodiment.

Step 5: the network side decodes the preamble, but cannot decode PUSCH data in step 4.

The network side acquires, through preamble information, that the UE performs the 2-step RACH procedure, and judges that the UE triggers the UL data transmission procedure.

Step 6: the network side feeds back the second RAR.

Optionally, the second RAR is the fallback RAR.

Figure 18:
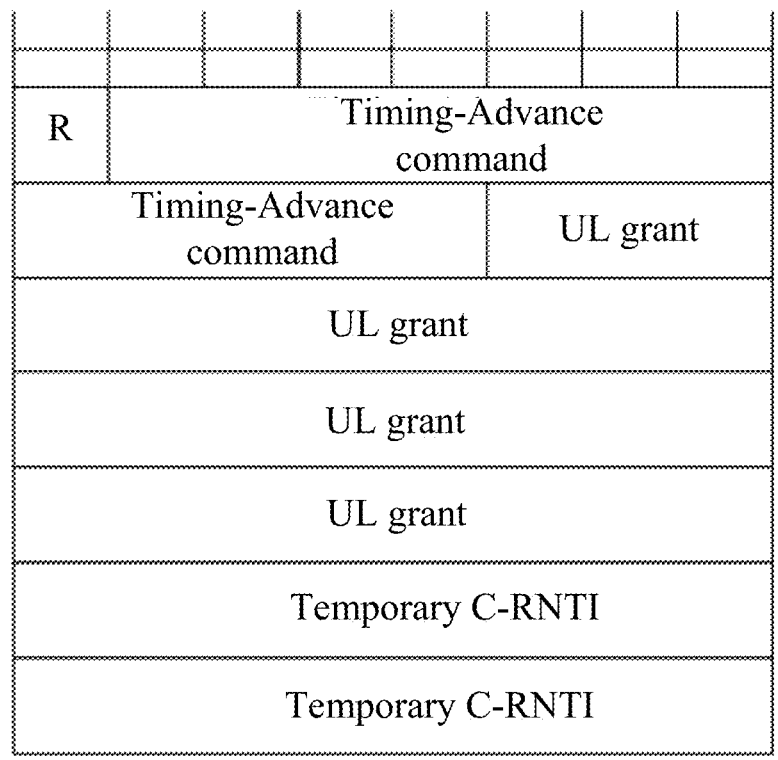
FIG. 18 is a schematic diagram of a second RAR in Fifth Embodiment of the present disclosure.

Optionally, TC-RNTI (Temporary C-RNTI) in the fallback RAR is the RNTI notified by the RRC release message, and the format of the second RAR may be shown in FIG. 18.

Step 7: the UE transmits UL data, including the first UL data in step 4, according to the UL grant in the second RAR.

Optionally, the first UL data may also be reconstructed, such as deleting DRB data therein, or adding more DRB data. The amount of data depends on the size of the UL grant.

For the description of step 8 and step 9, reference may be made to step 8 and step 9 in the First Embodiment.

Sixth Embodiment

Figure 19:
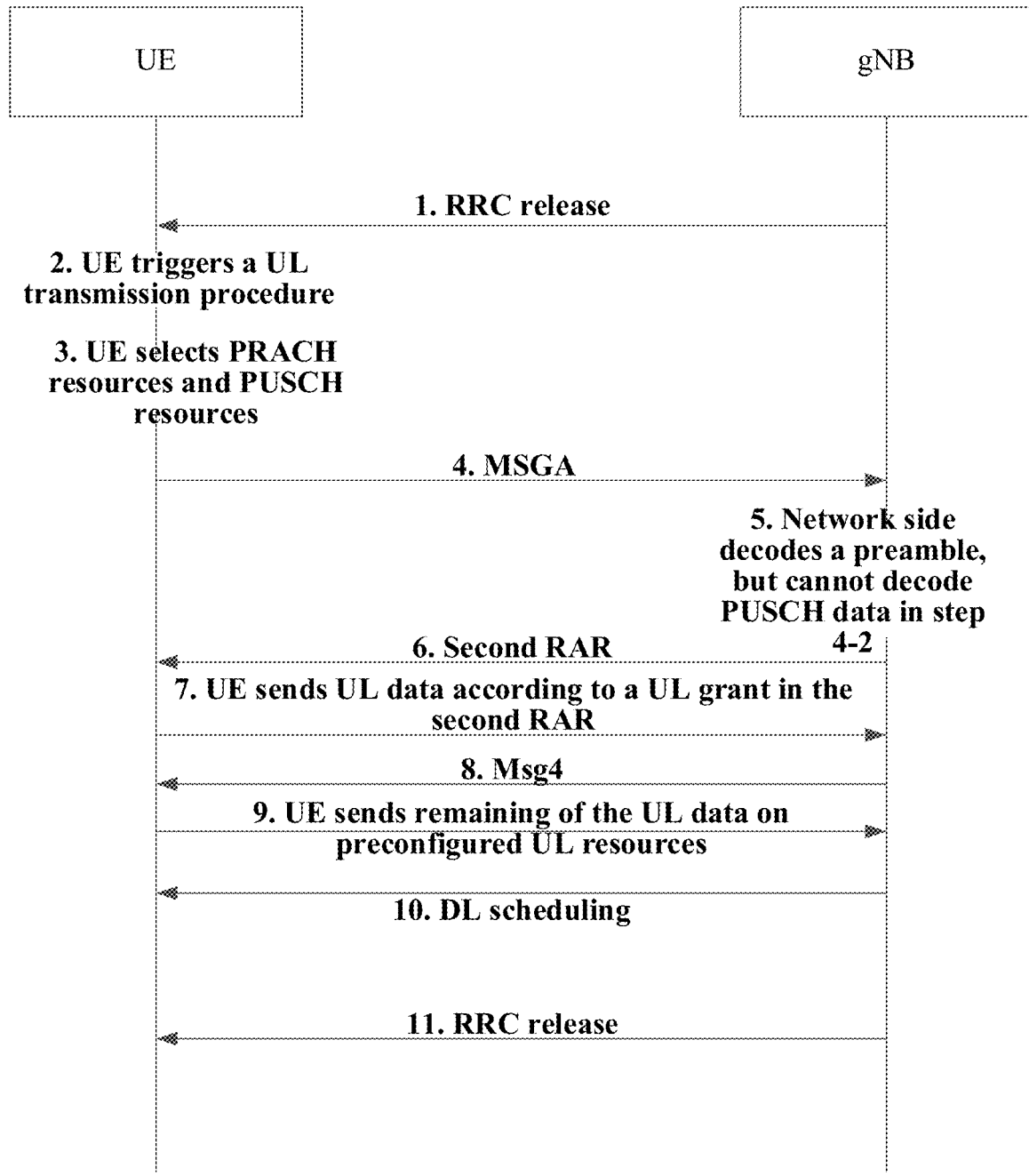
FIG. 19 is a flowchart of Sixth Embodiment of the present disclosure.

When the network side feeds back the fallback RAR, the UE is instructed in Msg4 to use the preconfigured UL resource, see FIG. 19.

For the description of steps 1 to 7, reference may be made to steps 1 to 7 in Fourth Embodiment.

Step 8: the network side feeds back Msg4.

Optionally, when the network side transmits the Msg4, the network side transmits a first UL indication, the first UL indication indicates whether the UE needs to transmit the remaining of the UL data in the pre-configured UL resource.

Figure 20:
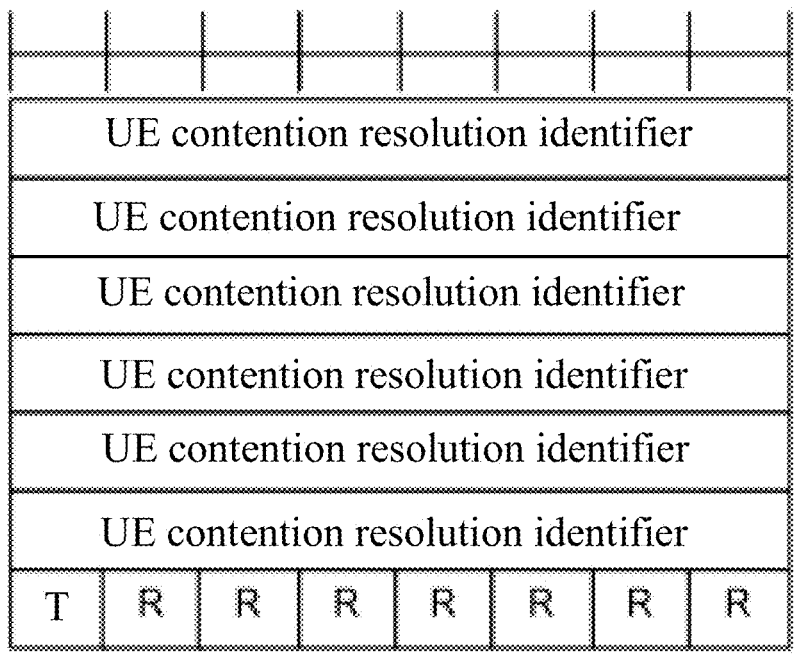
FIG. 20 is a schematic diagram of an Msg4 format in Sixth Embodiment of the present disclosure.

Optionally, when feeding back the Msg4, the Msg4 carries a T bit for indication, where T=1 indicates that the UE sends the remaining of the UL data in the pre-configured UL resource, and the format of the Msg4 may be shown in FIG. 20.

Optionally, when the network side feeds back the Msg4, the network side instructs, through an RRC message multiplexed with the Msg4, the UE to send the remaining of the UL data in the pre-configured UL resource.

Step 9: the UE sends UL data on a subsequent pre-configured UL resource.

For the description of step 10 and step 11, reference may be made to the description of step 10 and step 11 of Fourth Embodiment.

Embodiment 7

The data amount of the UL data of the UE indicates a sending procedure.

Step 1: the UE receives configuration information from the network side.

Optionally, the configuration information includes one or more of the following:
  (1) configured grant resources available by the UE in the inactive state;
  (2) preambles used when the UE executes the first UL data transmission procedure;
  (3) PUSCH information used when performing the 2-step RACH;
  (4) PUCCH resources used when the UE performs feedback of the first UL data transmission procedure;
  (5) PDCCH resource information, such as search space information, of receiving retransmission or scheduling a new transmission;
  (6) configuration information of a DRB bearer of UE;
  (7) UE BSR configuration information or UL indication information configuration;
  (8) threshold information.

Optionally, the configuration information is carried in an RRC Release message.

Step 2: the UL data of the UE arrives, and the UE selects a UL data transmission procedure according to the data amount of the UL data.

The UE triggers UL data transmission according to configuration such as configured BSR configuration information or the UL indication information.

Optionally, the UE determines whether UL is synchronized at this time, for example, the UE determines whether a UL timing advance timer times out, and if it times out, the UE will consider that the UL is out of sync.

Optionally, the UE judges a threshold value of the data amount of the UL data. For example, the data amount of the UL data is smaller than the first threshold, the UE transmits the UL data through the EDT procedure; if the data amount of the UL data of the UE is larger than the first threshold, and the data amount of the UL data is smaller than the second threshold, the UE transmits UL data through the first UL data transmission procedure.

Optionally, the UE determines a bearer ID of UL-triggered data transmission, and if the bearer ID matches with a bearer ID configured by the network side, the UE performs the first UL data transmission procedure. The bearer ID configured by the network side is an ID corresponding to executing the first UL data transmission procedure.

Optionally, the EDT procedure and the first UL data transmission procedure correspond to different preambles.

Figure 21:
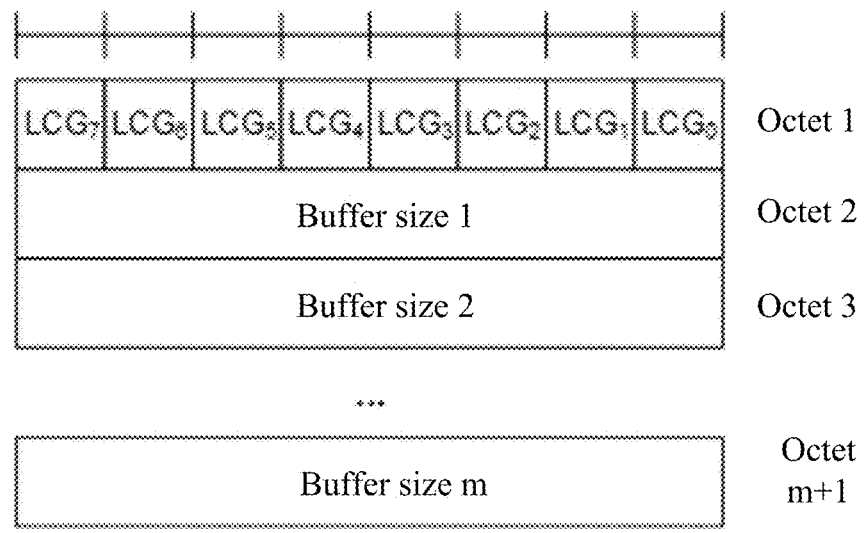
FIG. 21 is a schematic diagram of a packet format of UL indication information in Seventh Embodiment of the present disclosure.

Step 3: the UE constructs packets according to the UL indication information. A packet format of the UL indication information is shown in FIG. 21:

Mode 1: a BSR format.

Figure 22:
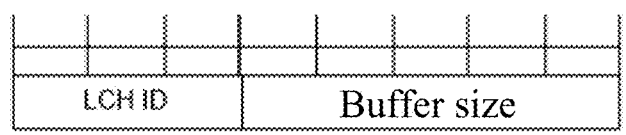
FIG. 22 is a schematic diagram of a Logical Channel (LCH) ID configuration in Seventh Embodiment of the present disclosure.

Mode 2: the LCH ID is configured by the configuration information. Since the UE is in the inactive state or the IDLE state, only a few LCH channels normally trigger UL data transmission. Referring to FIG. 22, one logical channel is taken as an example.

Mode 3: the UE sends an UL data indication, where the indication is a bit for indicating to the base station that the UE has more UL data to send.

Optionally, the UL data indication may be sent in a PUSCH channel in the MsgA, for example, multiplexed in a UL MAC CE in the MsgA, or sent through an RRC message in the MsgA. The UL data indication may be transmitted on a PUR resource, for example, multiplexed into the MAC CE using the above three modes, or may be transmitted to the network side through an RRC message.

Eighth Embodiment

Figure 23:
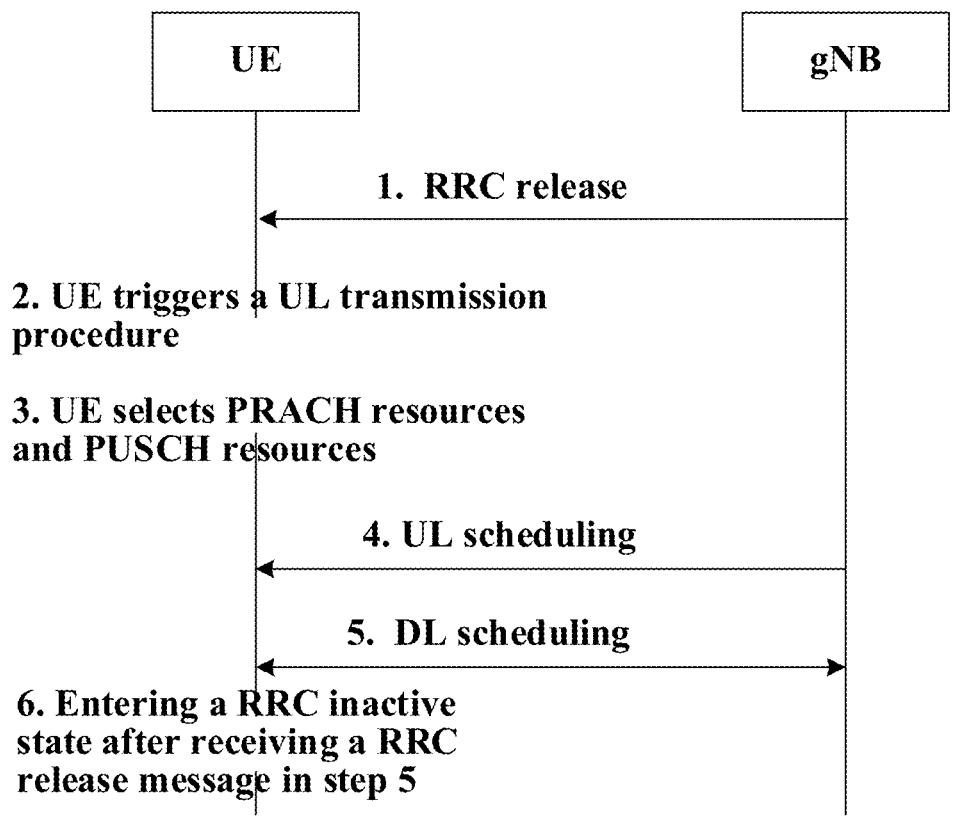
FIG. 23 is a flowchart of Eighth Embodiment of the present disclosure.

A configured grant solution: The base station indicates to indicate the UL grant through a PDCCH, and the UE transmits the remaining of the UL data according to the UL grant, see FIG. 23.

Step 1: the UE receives an RRC release message, where the RRC release message indicates that the UE enters the RRC inactive state.

Optionally, the UE receives one or more of the following:
(1) security parameters, such as NCC;
(2) configured grant information such as a SCS, a PUSCH duration, a MCS, frequency modulation information, pilot information, etc;
(3) threshold information of a size of the UL data, optionally, the threshold information includes a first threshold and a second threshold.

Optionally, the above information may be sent through an RRC Release message, or may also be sent through a broadcast message.

Step 2: data of the UE arrives, and the UE triggers a UL data transmission procedure.

Optionally, the UE compares the threshold of the data amount of the UL data; when the threshold of the data amount of the UL data is smaller than the first threshold, the UE selects to perform the EDT procedure; when the threshold of the data amount of the UL data is smaller than the second threshold (or, when the threshold of the data amount of the UL data is smaller than the second threshold and the data amount of the UL data is larger than the first threshold), the UE selects the first UL data transmission procedure.

Optionally, when the UL data transmitted by the UE satisfies DRB configuration information configured by the network side, the first UL data transmission procedure is selected.

Step 3: the UE selects a configuration resource to send the first UL data.

The first UL data includes one or more of the following:
(1) indication of the amount of uplink data; the amount of uplink data indicates the size of the data amount of UL data, such as BSR, or may be an indication of a data amount interval;
(2) a RRC Resume Request;
(3) partial UL data.

In some embodiments, the partial UL data may be multiplexed into a NAS message and sent to the network side in a RRC signaling.

For example, the structure of the RRC signaling is:
RRCResumeRequest;
dedicatedInfoNas (UL user plane data is included therein);
ResumeID;
ShortResumeMAC-I;
ResumeCause.

In other embodiments, the partial UL data may also be sent to the base station in a form of DRB alone by being multiplexed together with a RRC message. A packet format is: MAC header|RLC Header|PDCP header|RRC Resume Request|MAC header|RLC Header|PDCP header|UL data:

It is understood that the UL data and a RRC Resume Request may be in a juxtaposed relationship with each other.

Optionally, the RNTI of the UE is included, and the RNTI is sent in an RRC Release message.

Step 4: the network side receives the indication of the data amount of the UL data, and uses the RNTI to schedule the remaining of the UL data of the UE.

Step 5: if the network side has DL data, then the network side schedules the DL data using the RNTI.

Optionally, the DL data may be an RRC Release message carrying a suspend indication.

Step 6: after receiving the RRCRelease message in step 5, the UE enters the RRC inactive state.

Figure 24:
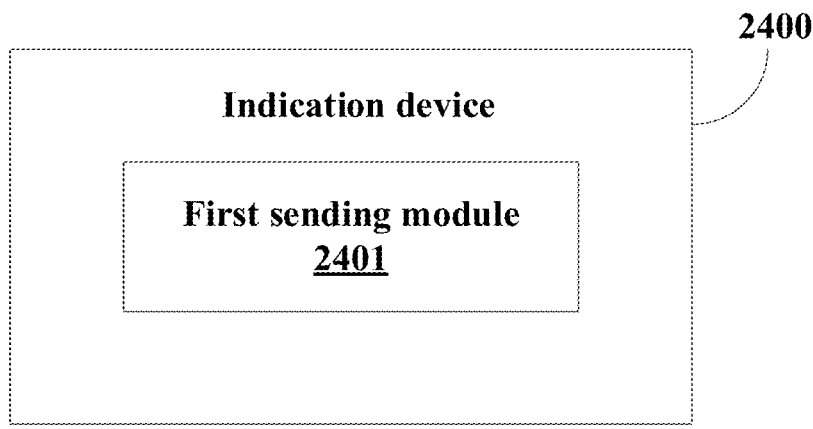
FIG. 24 is a first schematic diagram of an indication device according to some embodiments of the present disclosure.

Referring to FIG. 24, some embodiments of the present disclosure provide an indication device, which is applied to a terminal, and the indication device 2400 includes a first sending module 2401 configured to when a terminal is in a Radio Resource Control RRC idle state or an RRC inactive state, send first indication information to a network side, wherein the first indication information is used to indicate that UL data of the terminal satisfies a first condition.

The first condition includes one or more of following:
(1) a data amount of UL data is greater than a first threshold;

(2) a data amount of UL data is less than a second threshold;
(3) a data amount of UL data is greater than a first threshold, and the data amount of the UL data is less than a second threshold;
(4) the DRB triggering a UL data transmission procedure is configured by the network side.

In some embodiments, the indication device 2400 further includes a selecting module configured to: when the data amount of the UL data is less than the second threshold, or the data amount of the UL data is greater than a first threshold and the data amount of the UL data is less than the second threshold, or, the UL data sent by the UE satisfies DRB configuration information configured by the network side, select a UL data transmission procedure, the UL data transmission procedure and an EDT procedure correspond to different preambles.

In some embodiments, the device 2400 further includes: a first receiving module, configured to receive an UL grant from the network side; a second sending module, configured to send the UL data according to the UL grant.

In some embodiments, the first receiving module is further configured to receive a first Random Access Response (RAR) from the network side, the first RAR including the UL grant.

In some embodiments, the first RAR includes a first field, the first field indicates indication information about whether the first RAR includes the UL grant.

In some embodiments, the type of the first RAR is a fallback RAR or a success RAR.

In some embodiments, the UL grant is scheduled by a PDCCH, and a random access radio network temporary identifier for scrambling the PDCCH is notified by the first RAR, or configured by the RRC release message.

In some embodiments, the indication device 2400 further includes a second receiving module configured to receive second indication information from the network side, wherein the second indication information indicates the terminal to send the UL data using a configured grant resource.

For example, the manner of receiving the second indication information from the network side includes one of the following:
(1) receiving a second RAR from the network side, wherein the second RAR carries second indication information; it can be understood that the second RAR may be the same RAR as the first RAR, or may be a RAR different from the first RAR;
(2) receiving the PDCCH from the network side, wherein the PDCCH carries the second indication information;
(3) receiving a broadcast message from the network side, wherein the broadcast message carries the second indication information;
(4) receiving an RRC release message from the network side, wherein the RRC release message carries the second indication information.

In some embodiments, the first receiving module is further configured to receive a Msg4 from the network side, wherein the Msg4 includes the UL grant.

In some embodiments, the Msg4 includes third indication information, wherein the third indication information indicates one or more of following:
(1) whether a MAC CE of the Msg4 includes a field of the UL grant;
(2) whether the UE can transmit the UL data using a configured grant.

In some embodiments, the third indication information is included in a MAC CE of the Msg4; or, the third indication information is included in a Radio Resource Control RRC message, and the RRC message further includes the Msg4, that is, the third indication information and the Msg4 are multiplexed in the RRC message.

In some embodiments, the first threshold and/or the second threshold are configured by the network side.

In some embodiments, the first threshold is notified by an RAR message or notified by a broadcast message, or an RRC release message, or the first threshold is a transport block size of a configured grant resource in an inactive state; the second threshold is notified by an RRC release message or a broadcast message.

In some embodiments, the first indication information is one of following:
(1) a preamble;
(2) a Buffer Status Report (BSR);
(3) a DRB identifier and a data amount of UL data corresponding to a DRB;
(4) a DRB identifier (DRB ID);
(5) a service pattern.

The indication device provided in the embodiments of the present disclosure can execute the method embodiment shown in FIG. 6, and implementation principles and technical effects are similar and are not repeated here in the embodiments.

Figure 25:
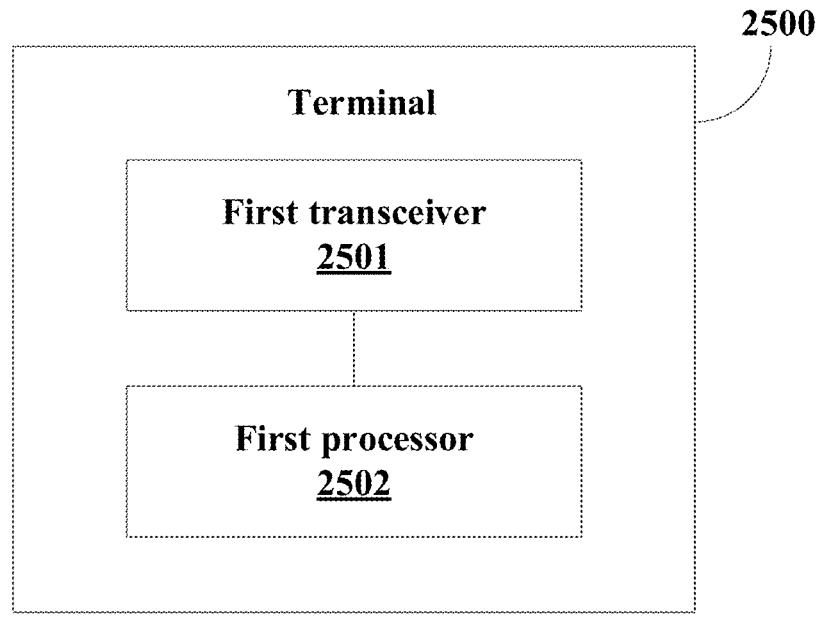
FIG. 25 is a schematic diagram of a terminal according to some embodiments of the present disclosure.

Referring to FIG. 25, the embodiments of the present disclosure provide a terminal 2500 including a first transceiver 2501 and a first processor 2502.

The first transceiver 2501 transmits and receives data under the control of the first processor 2502; the first processor 2502 reads a program in a memory to perform the following operations: when the terminal is in a Radio Resource Control RRC idle state or an RRC inactive state, sending first indication information to a network side, wherein the first indication information is configured to indicate that UL data of the terminal satisfies a first condition;

The first condition includes one or more of following:
(1) a data amount of UL data is greater than a first threshold;
(2) a data amount of UL data is less than a second threshold;
(3) a data amount of UL data is greater than a first threshold, and the data amount of the UL data is less than a second threshold;
(4) the DRB triggering a UL data transmission procedure is configured by the network side.

In some embodiments, when the first processor 2502 reads the program in the memory, the first processor 2502 further performs the follow operations: when the data amount of the UL data is less than the second threshold, or the data amount of the UL data is greater than a first threshold and the data amount of the UL data is less than the second threshold, or, the UL data satisfies DRB configuration information configured by the network side, selecting a UL data transmission procedure, the UL data transmission procedure and an EDT procedure correspond to different preambles.

In some embodiments, when the first processor 2502 reads the program in the memory, the first processor 2502 further performs the follow operations: receiving an UL grant from the network side; sending the UL data according to the UL grant.

In some embodiment, when the first processor 2502 reads the program in the memory, the first processor 2502 further performs the follow operations: receiving a first RAR from the network side, the first RAR including the UL grant.

In some embodiments, the first RAR includes a first field, the first field indicates indication information about whether the first RAR includes the UL grant.

In some embodiments, the type of the first RAR is a fallback RAR or a success RAR.

In some embodiments, the UL grant is scheduled by a PDCCH, and a random access radio network temporary identifier for scrambling the PDCCH is notified by the first RAR, or configured by the RRC release message.

In some embodiment, when the first processor 2502 reads the program in the memory, the first processor 2502 further performs the follow operations: receiving second indication information from the network side, wherein the second indication information indicates the terminal to send the UL data using a configured grant resource.

For example, the manner of receiving the second indication information from the network side includes one of the following:
  (1) receiving a second RAR from the network side, wherein the second RAR carries second indication information; it can be understood that the second RAR may be the same RAR as the first RAR, or may be a RAR different from the first RAR;
  (2) receiving the PDCCH from the network side, wherein the PDCCH carries the second indication information;
  (3) receiving a broadcast message from the network side, wherein the broadcast message carries the second indication information;
  (4) receiving an RRC release message from the network side, wherein the RRC release message carries the second indication information.

In some embodiments, when the first processor 2502 reads the program in the memory, the first processor 2502 further performs the follow operations: receiving a Msg4 from the network side, wherein the Msg4 includes the UL grant.

In some embodiments, the Msg4 includes third indication information, wherein the third indication information indicates one or more of following:
  (1) whether a MAC CE of the Msg4 includes a field of the UL grant;
  (2) whether the UE can transmit the UL data using a configured grant.

In some embodiments, the third indication information is included in a MAC CE of the Msg4; or, the third indication information is included in a Radio Resource Control RRC message, and the RRC message further includes the Msg4.

In some embodiments, the first threshold and/or the second threshold are configured by the network side.

In some embodiments, the first threshold is notified by an RAR message or notified by a broadcast message, or an RRC release message, or the first threshold is a transport block size of a configured grant resource in an inactive state; the second threshold is notified by an RRC release message or a broadcast message.

In some embodiments, the first indication information is one of following:
  (1) a preamble;
  (2) a Buffer Status Report (BSR);
  (3) a DRB identifier and a data amount of UL data corresponding to a DRB;
  (4) a DRB identifier (DRB ID);
  (5) a service pattern.

The terminal provided in the embodiments of the present disclosure can execute the method embodiment shown in FIG. 6, and implementation principles and technical effects are similar and are not repeated here in the embodiments.

Figure 26:
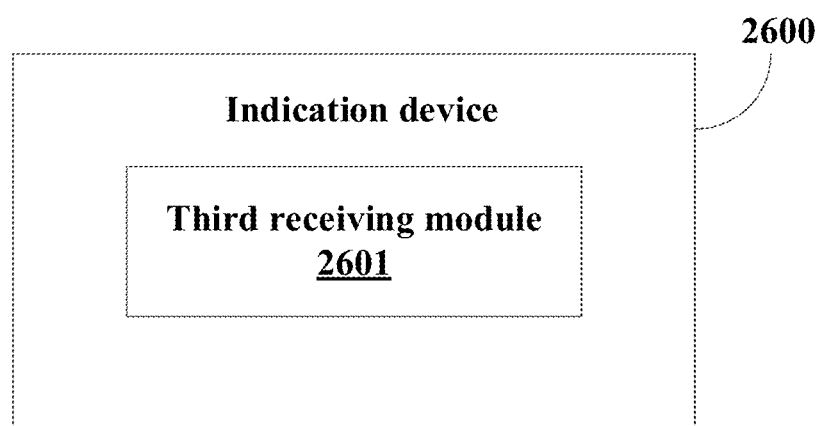
FIG. 26 is a second schematic diagram of an indication device according to some embodiments of the present disclosure.

Referring to FIG. 26, the embodiments of the present disclosure provide an indication device applied to a network-side device, and the indication device 2600 includes a third receiving module 2601 configured to receive first indication information from a terminal which is in an RRC idle state or an RRC inactive state, wherein the first indication information is configured to indicate that UL data of the terminal satisfies a first condition.

The first condition includes one or more of following:
  (1) a data amount of UL data is greater than a first threshold;
  (2) a data amount of UL data is less than a second threshold;
  (3) a data amount of UL data is greater than a first threshold, and the data amount of the UL data is less than a second threshold;
  (4) a DRB triggering a UL data transmission procedure is configured by the network side.

In some embodiments, the indication device 2600 further includes a third sending module, configured to send a UL grant to the terminal, the UL grant being used for the terminal to send the remaining of the UL data.

In some embodiments, the third sending module is further configured to send a first RAR to the terminal, the first RAR including the UL grant.

In some embodiments, the first RAR includes a first field, the first field indicates indication information about whether the first RAR includes the UL grant.

In some embodiments, the type of the first RAR is a fallback RAR or a success RAR.

In some embodiments, the UL grant is scheduled by a PDCCH, and a random access radio network temporary identifier for scrambling the PDCCH is notified by the first RAR, or configured by the RRC release message.

In some embodiments, the indication device 2600 further includes a fourth sending module, configured to send second indication information to the terminal, wherein the second indication information indicates that the terminal sends the UL data using a configured grant resource.

In some embodiments, the third sending module is further configured to send a Msg4 to the terminal, wherein the Msg4 includes the UL grant.

In some embodiments, the Msg4 includes third indication information, wherein the third indication information indicates one or more of following:
  (1) whether a MAC CE of the Msg4 includes a field of the UL grant;
  (2) whether the UE can transmit the UL data using a configured grant.

In some embodiments, the third indication information is included in a MAC CE of the Msg4; or the third indication information is included in an RRC message, and the RRC message further includes the Msg4.

In some embodiments, the indication device 2600 further includes a fifth sending module, configured to send the first threshold and/or the second threshold to the terminal through an RRC release message, an RAR message or a broadcast message.

In some embodiments, the first indication information may be one of following:
  (a) a preamble;
  (b) a Buffer Status Report (BSR);
  (c) a DRB identifier and a data amount of UL data corresponding to a DRB;
  (d) a DRB identifier (DRB ID);
  (e) a service pattern.

The indication device provided in the embodiments of the present disclosure can execute the method embodiment shown in FIG. 7, and implementation principles and technical effects are similar and are not repeated here in the embodiment.

Figure 27:
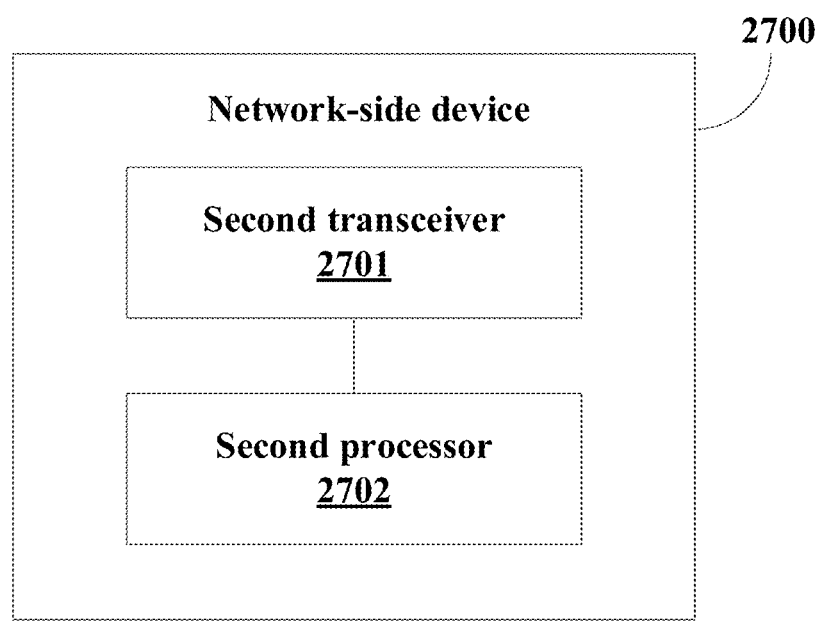
FIG. 27 is a schematic diagram of a network-side device according to some embodiments of the present disclosure.

Referring to FIG. 27, the embodiments of the present disclosure provide a network-side device 2700 including a second transceiver 2701 and a second processor 2702.

The second transceiver 2701 transmits and receives data under the control of the second processor 2702.

The second processor 2702 reads a program in a memory to perform following operations: receiving first indication information from a terminal which is in an RRC idle state or an RRC inactive state, wherein the first indication information is configured to indicate that UL data of the terminal satisfies a first condition. The first condition includes one or more of following:
- (1) a data amount of UL data is greater than a first threshold;
- (2) a data amount of UL data is less than a second threshold;
- (3) a data amount of UL data is greater than a first threshold, and the data amount of the UL data is less than a second threshold;
- (4) a DRB triggering a UL data transmission procedure is configured by the network side.

In some embodiments, the second processor 2702 reads the program in the memory to perform following operations: sending the UL grant to the terminal, the UL grant being used for the terminal to send the remaining of the UL data.

In some embodiments, the second processor 2702 reads the program in the memory to perform following operations: sending a first RAR to the terminal, the first RAR including the UL grant.

In some embodiments, the first RAR includes a first field, the first field indicates indication information about whether the first RAR includes the UL grant.

In some embodiments, the type of the first RAR is a fallback RAR or a success RAR.

In some embodiments, the UL grant is scheduled by a PDCCH, and a random access radio network temporary identifier for scrambling the PDCCH is notified by the first RAR, or configured by the RRC release message.

In some embodiments, the second processor 2702 reads the program in the memory to perform following operations: sending second indication information to the terminal, wherein the second indication information indicates that the terminal sends the UL data using a configured grant resource.

In some embodiments, the second processor 2702 reads the program in the memory to perform following operations: sending a Msg4 to the terminal, wherein the Msg4 includes the UL grant.

In some embodiments, the Msg4 includes third indication information, wherein the third indication information indicates one or more of following:
- (1) whether a MAC CE of the Msg4 includes a field of the UL grant;
- (2) whether the UE can transmit the UL data using a configured grant.

In some embodiments, the third indication information is included in a MAC CE of the Msg4; or the third indication information is included in an RRC message, and the RRC message further includes the Msg4.

In some embodiment, the second processor 2702 reads the program in the memory to perform following operations: sending the first threshold and/or the second threshold to the terminal through an RRC release message, an RAR message or a broadcast message.

In some embodiments, the first indication information is one of following:
- (a) a preamble;
- (b) a Buffer Status Report (BSR);
- (c) a DRB identifier and a data amount of UL data corresponding to a DRB;
- (d) a DRB identifier (DRB ID);
- (e) a service pattern.

The network-side device provided in the embodiments of the present disclosure may execute the method embodiment shown in FIG. 7, and implementation principles and technical effects are similar and are not repeated here in this embodiment.

Steps of the method or the algorithm described in connection with the present disclosure may be implemented in hardware or may be implemented by a processor executing software instructions. The software instructions may consist of corresponding software modules. The software modules may be stored in a RAM, a flash memory, a ROM, an EPROM, an EEPROM, registers, hard disks, removable hard disks, read only optical disks, or any other form of storage medium well known in the art. An exemplary storage medium is coupled to a processor such that the processor can read information from the storage medium and can write information to the storage medium. Of course, the storage medium may also be an integral part of the processor. The processor and the storage medium may be located in an ASIC. In addition, the ASIC may be located in a core network interface device. Of course, the processor and the storage medium may also exist as separate components in the core network interface device.

Those skilled in the art will appreciate that in one or more of the above embodiments, functions described in the present disclosure may be implemented in hardware, software, firmware, or any combination thereof. When implemented using software, the functions may be stored in a readable medium or transmitted as one or more instructions or codes on the readable medium. Readable media include a computer storage medium and a communication medium, wherein the communication medium includes any medium that facilitates transfer of a computer program from one place to another. The storage medium may be any available medium accessible by a general purpose or special purpose computer.

The objects, technical solutions and beneficial effects of the present disclosure are further described in detail in the above specific embodiments. It should be understood that the above describes only specific embodiments of the present disclosure, but is not intended to limit the protection scope of the present disclosure, and any modification, equivalent replacement, improvement, etc. made on the basis of the technical solutions of the present disclosure should be included in the protection scope of the present disclosure.

Those skilled in the art will appreciate that the embodiments of the present disclosure may be provided as methods, systems, or computer program products. Accordingly, embodiments of the present disclosure may take the form of an entire hardware embodiment, an entire software embodiment, or an embodiment combining software and hardware aspects. Embodiments of the present disclosure may employ a form of a computer program product implemented on one or more computer usable storage media (including, but not limited to, a disk storage, CD-ROM, an optical storage, and the like) including computer-usable program codes.

Embodiments of the present disclosure are described with reference to flow charts and/or block diagrams of methods, apparatus (systems), and computer program products according to the embodiments of the present disclosure. It should be understood that each of the flows and/or blocks in the flow charts and/or block diagrams, and combinations of the flows and/or the blocks in the flow charts and/or the block diagrams, may be implemented by computer program instructions. These computer program instructions may be provided to a processor of a general purpose computer, a special purpose computer, an embedded processor, or other programmable data processing device to produce a machine, and a means for implementing functions specified in one or more flows of the flowcharts and/or one or more blocks of the block diagrams is generated when the processor in a computer or other programmable data processing device executes the instructions.

The computer program instructions may also be stored in a computer readable memory capable of directing a computer or other programmable data processing device to operate in a particular manner, and an manufacture including an instruction apparatus is generated by the instruction stored in the computer readable memory, the instruction apparatus implements functions specified in one or more flows of the flowcharts and/or one or more blocks of the block diagrams.

These computer program instructions may also be loaded onto a computer or other programmable data processing device such that a series of operational steps are performed on the computer or other programmable device to produce a computer-implemented process, so that instructions executed on the computer or the other programmable device provide steps for implementing the functions specified in one or more flows of the flowcharts and/or one or more blocks of the block diagrams.

The functions may be stored in a computer-readable storage medium if implemented in the form of software functional units and sold or used as stand-alone products. Based on such understanding, a substantial part or a part contributing to the related art of the technical solutions of the present disclosure may be embodied in the form of software products, the computer software products being stored in a storage medium which includes instructions to cause a computer device (which may be a personal computer, a server, or a network device, etc.) to perform all or part of the steps of the methods described in various embodiments of the present disclosure. The storage medium includes various media capable of storing program codes, such as a USB disk, a portable hard disk, a ROM, a RAM, a magnetic disk, or an optical disk.

One of ordinary skill in the art can understand that implementation of all or part of the flows for implementing the method embodiments can be completed by related hardware controlled by a computer program. The program may be stored in a computer-readable storage medium and, when being executed, the program may include flows in the embodiments of the methods described above. The storage medium may be a magnetic disk, an optical disk, a read-only memory (Read-Only Memory), a random access memory (Random Access Memory, RAM) or the like.

It will be appreciated that the embodiments described in the present disclosure may be implemented in hardware, software, firmware, middleware, microcode, or combinations thereof. For hardware implementation, modules, units, and sub-units may be implemented in one or more of Application Specific Integrated Circuits (ASIC), Digital Signal Processors (DSP), Digital Signal Processing Devices (DSP Device, DSPD), Programmable Logic Devices (PLD), Field-Programmable Gate Array (FPGAs), general purpose processors, controllers, microcontrollers, microprocessors, other electronic units for performing the functions described in this disclosure, or combinations thereof.

For software implementations, the techniques described in embodiments of the disclosure may be implemented by modules (e.g., processes, functions, etc.) that perform the functions described in embodiments of the disclosure. The software codes may be stored in a memory and executed by a processor. The memory may be implemented in the processor or external to the processor.

It will be apparent to those skilled in the art that various changes and modifications may be made to the embodiments of the present disclosure without departing from the spirit and the scope of the present disclosure. As such, the present disclosure is also intended to include such modifications and changes of the embodiments of the present disclosure provided they fall within the scope of the claims of the present disclosure and their equivalents.

What is claimed is:

1. An indication method performed by a terminal, comprising:
    sending first indication information to a network side when the terminal is in a Radio Resource Control (RRC) idle state or an RRC inactive state, the first indication information being configured to indicate that Uplink (UL) data of the terminal satisfies a first condition, wherein the first condition comprises one or more of the following:
    a data amount of the UL data is greater than a first threshold;
    a data amount of the UL data is less than a second threshold;
    a Data Radio Bearer (DRB) triggering a UL data transmission procedure is configured by the network side,
    wherein, the first threshold and/or the second threshold are configured by the network side;
    wherein after sending the first indication information to the network side, the method further comprises receiving a UL grant from the network side;
    wherein receiving the UL grant from the network side comprises: receiving a Message 4 (Msg4) from the network side, wherein the Msg4 comprises the UL grant, the Msg4 comprises third indication information, the third indication information indicates one or more of following:
        whether a Media Access Control Control Element (MAC CE) of the Msg4 comprises a field of the UL grant;
        whether the terminal can transmit the UL data using a configured grant.

2. The method according to claim 1, wherein after receiving the UL grant from the network side, the method further comprises:
    sending the UL data according to the UL grant;
    wherein the UL grant is scheduled by a Physical Downlink Control Channel (PDCCH), and a random access radio network temporary identifier for scrambling the PDCCH is notified by the first Random Access Response (RAR) or configured by a RRC release message.

3. The method according to claim 1, further comprising:
receiving second indication information from the network side, wherein the second indication information indicates the terminal to send the UL data using a configured grant resource.

4. The method according to claim 3, wherein receiving the second indication information from the network side comprises:
receiving a second Random Access Response (RAR) from the network side, wherein the second RAR carries second indication information;
or,
receiving a Physical Downlink Control Channel (PDCCH) from the network side, wherein the PDCCH carries the second indication information;
or,
receiving a broadcast message from the network side, wherein the broadcast message carries the second indication information;
or,
receiving a RRC release message from the network side, wherein the RRC release message carries the second indication information.

5. The method according to claim 1, wherein,
the second threshold is notified by the network side through an RRC release message or notified by the network side through a broadcast message.

6. The method according to claim 1, wherein the first indication information is one of following:
a preamble;
a Buffer Status Report;
a Data Radio Bearer (DRB) identifier and a data amount of UL data corresponding to a DRB;
a DRB identifier;
a service pattern.

7. The method according to claim 1, wherein the first threshold is notified by the network side through a Random Access Response (RAR) message, or is notified by the network side through a broadcast message, or is notified by the network side through an RRC release message, or the first threshold is a transport block size of a configured grant resource in an inactive state.

8. An indication method performed by a network-side device, comprising:
receiving first indication information from a terminal that is in a Radio Resource Control (RRC) idle state or an RRC inactive state, wherein the first indication information is configured to indicate that Uplink (UL) data of the terminal satisfies a first condition, the first condition comprises one or more of the following:
a data amount of the UL data is greater than a first threshold;
a data amount of the UL data is less than a second threshold;
a Data Radio Bearer (DRB) triggering a UL data transmission procedure is configured by the network side,
wherein, the first threshold and/or the second threshold are configured by the network side;
wherein the method further comprises sending a UL grant to the terminal, wherein sending the UL grant to the terminal comprises sending a Message 4 (Msg4) to the terminal, the Msg4 comprising the UL grant, wherein the Msg4 comprises third indication information, the third indication information indicates one or more of following:
whether a Media Access Control Control Element (MAC CE) of the Msg4 comprises a field of the UL grant;
whether the UE can transmit the UL data using a configured grant.

9. The method according to claim 8,
wherein the UL grant is configured for the terminal to send remaining of the UL data, the UL grant is scheduled by a Physical Downlink Control Channel (PDCCH), and a random access radio network temporary identifier for scrambling the PDCCH is notified by the first Random Access Response (RAR), or configured by a RRC release message.

10. The method according to claim 8, further comprising:
sending second indication information to the terminal, wherein the second indication information indicates that the terminal sends the UL data using a configured grant resource; and/or
sending the first threshold and/or the second threshold to the terminal through a RRC release message, a Random Access Response (RAR) message, or a broadcast message.

11. The method according to claim 10, wherein sending the second indication information to the terminal comprise one of the following:
sending a second Random Access Response RAR to the terminal, wherein the second RAR carries the second indication information;
sending a Physical Downlink Control Channel (PDCCH) to the terminal, wherein the PDCCH carries the second indication information;
sending a broadcast message to the terminal, wherein the broadcast message carries the second indication information;
sending an RRC release message to the terminal, wherein the RRC release message carries the second indication information.

12. The method according to claim 8, wherein the first indication information is one of the following:
a preamble;
a Buffer Status Report;
a Data Radio Bearer (DRB) identifier and a data amount of UL data corresponding to a DRB;
a DRB identifier;
a service pattern.

13. A network-side device, comprising a second transceiver and a second processor,
wherein the second transceiver transmits and receives data under a control of the second processor; the second processor reads a program in a memory to perform steps of the indication method according to claim 8.

14. The network-side device according to claim 13, wherein the second processor reads the program in the memory to perform the following operation:
sending second indication information to the terminal, wherein the second indication information indicates that the terminal sends the UL data using a configured grant resource;
and/or sending the first threshold and/or the second threshold to the terminal through a RRC release message, a Random Access Response (RAR) message, or a broadcast message.

15. A terminal, comprising a first transceiver and a first processor,
wherein the first transceiver transmits and receives data under a control of the first processor; the first processor reads a program in a memory to perform a following operation:
sending first indication information to a network side when the terminal is in a Radio Resource Control (RRC) idle state or an RRC inactive state, the first indication information being configured to indicate that Uplink (UL) data of the terminal satisfies a first condition, wherein the first condition comprises one or more of the following:
a data amount of the UL data is greater than a first threshold;
a data amount of the UL data is less than a second threshold;
a Data Radio Bearer (DRB) triggering a UL data transmission procedure is configured by the network side,
wherein, the first threshold and/or the second threshold are configured by the network side;
wherein the first processor reads the program in the memory to perform a following operation: receiving a UL grant from the network side after sending the first indication information to the network side;
wherein receiving the UL grant from the network side comprises: receiving a Message 4 (Msg4) from the network side, wherein the Msg4 comprises the UL grant, the Msg4 comprises third indication information, the third indication information indicates one or more of following:
whether a Media Access Control Control Element (MAC CE) of the Msg4 comprises a field of the UL grant;
whether the terminal can transmit the UL data using a configured grant.

16. The terminal according to claim 15, wherein the first processor reads the program in the memory to further perform the following operation:
receiving second indication information from the network side, wherein the second indication information indicates the terminal to send the UL data using a configured grant resource.

17. The terminal according to claim 16, wherein receiving the second indication information from the network side comprises:
receiving a second RAR from the network side, wherein the second RAR carries second indication information;
or,
receiving a Physical Downlink Control Channel (PDCCH) from the network side, wherein the PDCCH carries the second indication information;
or,
receiving a broadcast message from the network side, wherein the broadcast message carries the second indication information;
or,
receiving a RRC release message from the network side, wherein the RRC release message carries the second indication information.

18. The terminal according to claim 15, wherein,
the second threshold is notified by the network side through an RRC release message or notified by the network side through a broadcast message.

19. The terminal according to claim 15, wherein the first indication information is one of following:
a preamble;
a Buffer Status Report;
a Data Radio Bearer (DRB) identifier and a data amount of UL data corresponding to a DRB;
a DRB identifier;
a service pattern.

20. The terminal according to claim 15, wherein, the first threshold is notified by the network side through a Random Access Response (RAR) message, or is notified by the network side through a broadcast message, or is notified by the network side through an RRC release message, or the first threshold is a transport block size of a configured grant resource in an inactive state.

* * * * *